US012573178B2

(12) United States Patent
Pan et al.

(10) Patent No.: US 12,573,178 B2
(45) Date of Patent: Mar. 10, 2026

(54) BRAIN IMAGE CLASSIFICATION METHOD BASED ON DISCRETIZED DATA

(71) Applicant: GUANGDONG POLYTECHNIC NORMAL UNIVERSITY, Guangdong (CN)

(72) Inventors: Dan Pan, Guangdong (CN); Yichong Zhang, Guangdong (CN); Qijun Chen, Guangdong (CN); Jin Lv, Guangdong (CN); Genqiang Luo, Guangdong (CN); An Zeng, Guangdong (CN); Yang Yang, Guangdong (CN); Jun Liu, Guangdong (CN)

(73) Assignee: GUANGDONG POLYTECHNIC NORMAL UNIVERSITY, Guangdong (CN)

( * ) Notice: Subject to any disclaimer, the term of this patent is extended or adjusted under 35 U.S.C. 154(b) by 255 days.

(21) Appl. No.: 18/409,697

(22) Filed: Jan. 10, 2024

(65) Prior Publication Data

US 2025/0005900 A1 Jan. 2, 2025

(30) Foreign Application Priority Data

Jun. 28, 2023 (CN) .......................... 202310773717.9

(51) Int. Cl.
*G06V 10/764* (2022.01)
*G06V 10/77* (2022.01)
(Continued)

(52) U.S. Cl.
CPC .......... *G06V 10/764* (2022.01); *G06V 10/771* (2022.01); *G06V 10/7715* (2022.01);
(Continued)

(58) Field of Classification Search
CPC ............... G06V 10/764; G06V 10/771; G06V 10/7715; G06V 10/774; G06V 10/776;
(Continued)

(56) References Cited

PUBLICATIONS

Tahan, "MEMOD: a novel multivariate evolutionary multi-objective discretization", 2017, Springer, pp. 302-323 (Year: 2017).*
(Continued)

*Primary Examiner* — Oneal R Mistry
*Assistant Examiner* — Justin Philip Cascais
(74) *Attorney, Agent, or Firm* — JCIPRNET

(57) ABSTRACT

The present invention discloses a brain image classification method based on discretized data, includes: dividing an original brain image dataset into an original training set, an original validation set, and an original test set; constructing a multi-objective function including an information loss before and after dataset discretization, a classification error rate, and a discrete data complexity, and obtaining a discretization scheme; discretizing the original training set, the original validation set and the original test set according to the discretization scheme; performing feature selection on a discrete training set and a discrete validation set, and performing feature reduction on the discrete training set, and a discrete test set using the feature selection result to obtain a reduced discrete training set and a reduced discrete test set; and training a classifier using the reduced discrete training set to classify the reduced discrete test set, to obtain a brain image data classification result.

9 Claims, 6 Drawing Sheets

(51) Int. Cl.
*G06V 10/771* (2022.01)
*G06V 10/774* (2022.01)
*G06V 10/776* (2022.01)

(52) U.S. Cl.
CPC .......... *G06V 10/774* (2022.01); *G06V 10/776* (2022.01); *G06V 2201/03* (2022.01)

(58) Field of Classification Search
CPC .............. G06V 2201/03; G06V 10/765; Y02T 10/40; G06N 3/126; G06T 7/0012; G06T 2207/10088; G06T 2207/30016
See application file for complete search history.

(56) References Cited

PUBLICATIONS

Asadi, "EMDID: Evolutionary multi-objective discretization for imbalanced datasets", 2017, Elsevier, pp. 442-461 (Year: 2017).*

* cited by examiner

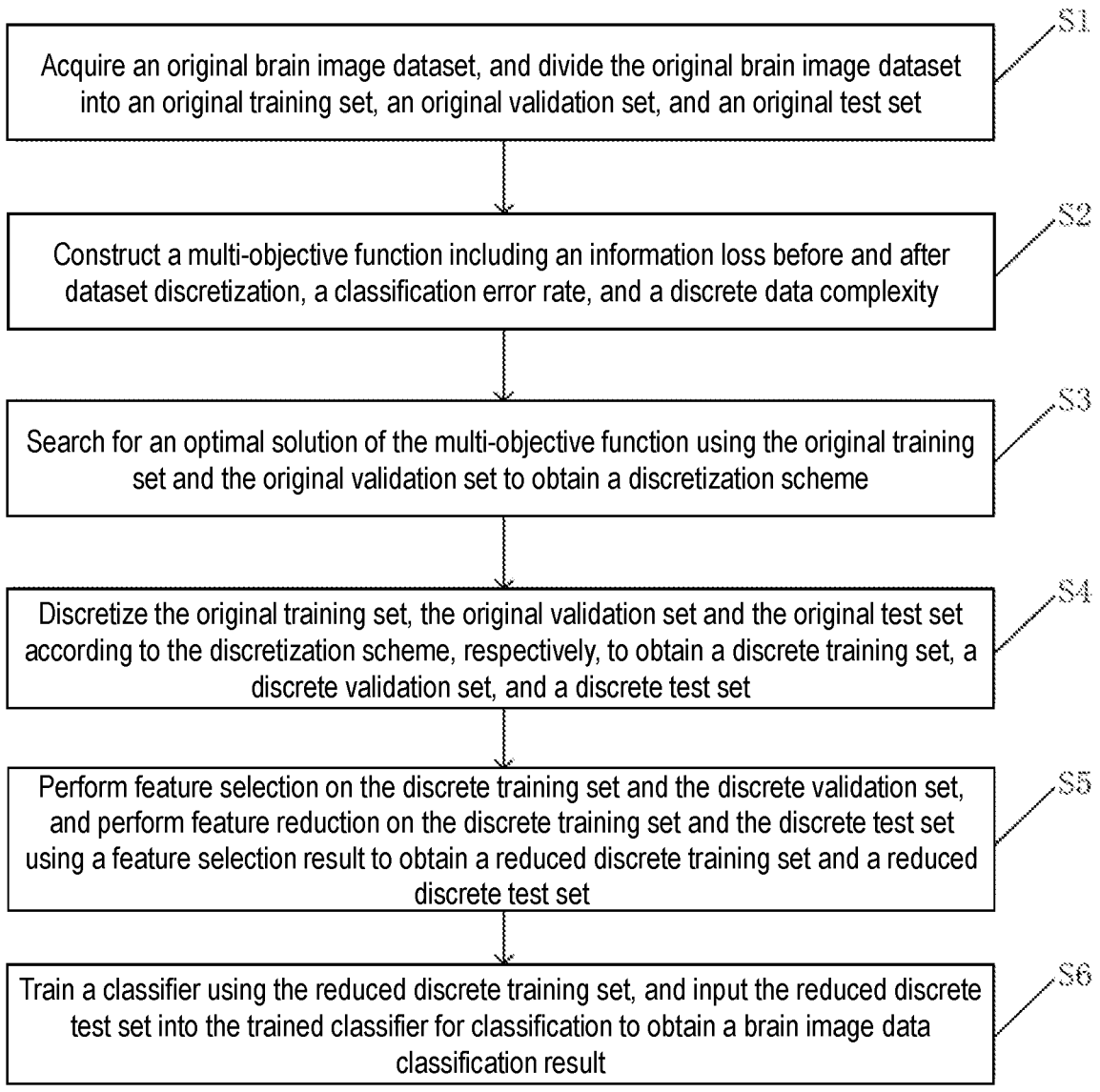

S1

Acquire an original brain image dataset, and divide the original brain image dataset into an original training set, an original validation set, and an original test set

S2

Construct a multi-objective function including an information loss before and after dataset discretization, a classification error rate, and a discrete data complexity

S3

Search for an optimal solution of the multi-objective function using the original training set and the original validation set to obtain a discretization scheme

S4

Discretize the original training set, the original validation set and the original test set according to the discretization scheme, respectively, to obtain a discrete training set, a discrete validation set, and a discrete test set

S5

Perform feature selection on the discrete training set and the discrete validation set, and perform feature reduction on the discrete training set and the discrete test set using a feature selection result to obtain a reduced discrete training set and a reduced discrete test set

S6

Train a classifier using the reduced discrete training set, and input the reduced discrete test set into the trained classifier for classification to obtain a brain image data classification result

FIG. 1

BRAIN IMAGE CLASSIFICATION METHOD BASED ON DISCRETIZED DATA

CROSS-REFERENCE TO RELATED APPLICATION

This application claims the priority benefit of China application serial no. 202310773717.9, filed on Jun. 28, 2023. The entirety of the above-mentioned patent application is hereby incorporated by reference herein and made a part of this specification.

TECHNICAL FIELD

The present invention relates to the field of data classification processing, in particular to a brain image classification method based on discretized data.

BACKGROUND

With the continuous development of brain imaging technology, machine learning has been widely used for research related to brain imaging. The classification of brain image data has become a hot research in brain image research.

A current brain image classification method based on machine learning often performs feature extraction on original brain image data, and uses a classifier to perform classification according to feature extraction results to obtain brain image classification results. Although this method may realize brain image classification, it does not take into account the correlation between data distribution characteristics and attributes, which leads to high computational complexity of algorithms and high storage requirements, resulting in low classification accuracy and low efficiency.

SUMMARY

In order to overcome the defects of low accuracy and low efficiency in the prior art, the present invention provides the following technical solutions:

The present invention provides a brain image classification method based on discretized data. The method includes:

S1: acquiring an original brain image dataset, and dividing the original brain image dataset into an original training set, an original validation set, and an original test set;

S2: constructing a multi-objective function including an information loss before and after dataset discretization, a classification error rate, and a discrete data complexity;

S3: searching for an optimal solution of the multi-objective function using the original training set and the original validation set to obtain a discretization scheme;

S4: discretizing the original training set, the original validation set and the original test set according to the discretization scheme, respectively, to obtain a discrete training set, a discrete validation set, and a discrete test set;

S5: performing feature selection on the discrete training set and the discrete validation set, and performing feature reduction on the discrete training set and the discrete test set using a feature selection result to obtain a reduced discrete training set and a reduced discrete test set;

S6: training a classifier using the reduced discrete training set, and inputting the reduced discrete test set into the trained classifier for classification to obtain a brain image data classification result.

BRIEF DESCRIPTION OF DRAWINGS

FIG. 1 is a schematic flow diagram of a brain image classification method based on discretized data in Embodiment 1.

DETAILED DESCRIPTION OF EMBODIMENTS

Figure 2:
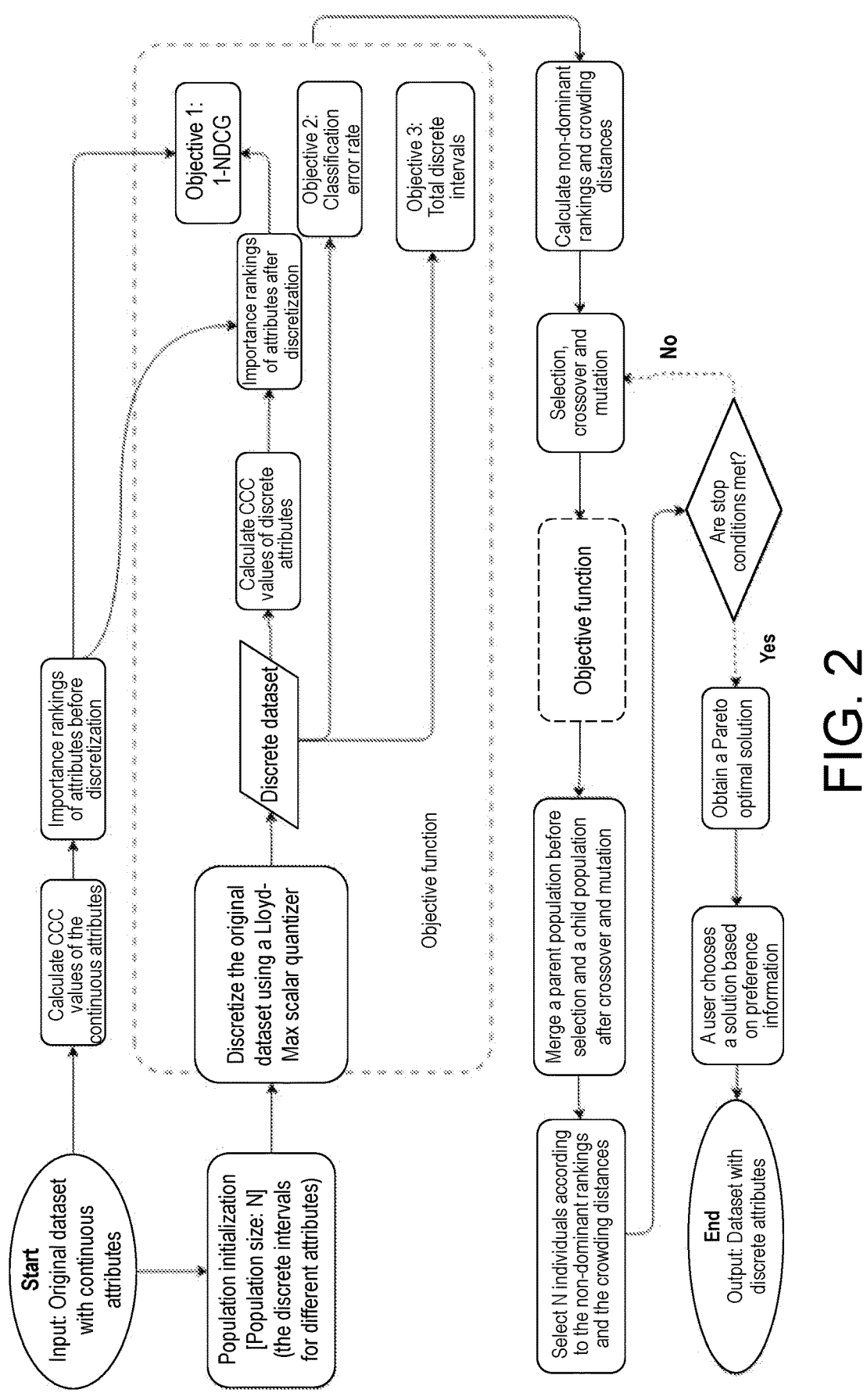
FIG. 2 is an implementation framework diagram for discretizing an original brain image dataset in Embodiment 2.

The implementations of the present invention will be described below with reference to the accompanying drawings and the preferred technical solutions, and a person skilled in the art can readily understand other advantages and effects of the present invention from the contents disclosed in this specification. The present invention can also be implemented or applied by other different specific implementations, and various details in this specification can also be modified or changed in various ways based on different views and applications without departing from the spirit of the present invention. It should be understood that the preferred technical solutions are merely for illustrating the present invention and are not intended to limit the scope of protection of the present invention.

It should be noted that the drawings provided in the following embodiments merely illustrate the basic concept of the present invention in a schematic manner, so that only the components related to the present invention are shown in the drawings rather than drawing according to the number, shape, and size of the components in actual implementations, the type, number, and proportion of the components may be arbitrarily changed in actual implementations, and the layout of the components may be more complex.

In the following description, a great deal of details are explored to provide a more thorough explanation of the embodiments of the present invention, however, it will be obvious to a person skilled in the art that embodiments of the present invention can be implemented without such specific details, and in other embodiments, the well-known structures and devices are shown in the form of block diagrams, rather than in the form of details, in order to avoid rendering the embodiments of the present invention difficult to understand.

Embodiment 1

Referring to FIG. 1, this embodiment provides a brain image classification method based on discretized data. The method includes:

S1: Acquire an original brain image dataset, and divide the original brain image dataset into an original training set, an original validation set, and an original test set.

S2: Construct a multi-objective function including an information loss before and after dataset discretization, a classification error rate, and a discrete data complexity.

S3: Search for an optimal solution of the multi-objective function using the original training set and the original validation set to obtain a discretization scheme.

S4: Discretize the original training set, the original validation set and the original test set according to the discretization scheme, respectively, to obtain a discrete training set, a discrete validation set, and a discrete test set.

S5: Perform feature selection on the discrete training set and the discrete validation set, and perform feature reduction on the discrete training set and the discrete test set using a feature selection result to obtain a reduced discrete training set and a reduced discrete test set.

S6: Train a classifier using the reduced discrete training set, and input the reduced discrete test set into the trained classifier for classification to obtain a brain image data classification result.

It should be understood that by discretizing the original brain image dataset and using the discretized brain image dataset for subsequent classification tasks, the correlation between distribution characteristics and attributes of data may be fully considered in order to retain key information, the computational complexity of algorithms and the storage requirements are reduced, and at the same time, the classification accuracy and efficiency are improved. By constructing the multi-objective function including the information loss before and after dataset discretization, the classification error rate, and the discrete data complexity, searching for the optimal solution of the multi-objective function using a multi-objective optimization algorithm to obtain the discretization scheme, and discretizing the original brain image dataset using the discretization scheme, the information loss before and after discretization of the brain image dataset may be reduced, and at the same time, the discretized brain image dataset is simpler, and the classification error rate is decreased, thereby greatly improving the classification accuracy and efficiency of the subsequent brain image classification tasks.

Embodiment 2

Referring to FIG. 1 and FIG. 2, this embodiment makes improvements on the basis of the brain image classification method based on discretized data according to Embodiment 1.

S1: Acquire an original brain image dataset, and divide the original brain image dataset into an original training set, an original validation set, and an original test set. In this embodiment, a COBRE dataset and an MCICShare dataset are downloaded from a SchizConnect database, and structural magnetic resonance imaging (structural MRI, sMRI) data samples are acquired from the COBRE dataset and the MCICShare dataset. The sMRI data samples include two groups: patients with schizophrenia (SC) and normal controls (HC). Data of the two datasets, COBRE and MCICShare, is shown in Table 1.

TABLE 1

| Dataset information | | | | |
| --- | --- | --- | --- | --- |
| | Dataset | COBRE | MCICShare | Sum |
| Scanning field strength | | 3T | 1.5T, 3T | — |
| SC | Number of people (male/female) | 90(72/18) | 108(82/26) | 198(154/44) |
| | Average age | 38.2 | 34.3 | 36.1 |
| HC | Number of people (male/female) | 94(67/27) | 95(65/30) | 189(132/57) |
| | Average age | 38.5 | 33.3 | 35.9 |
| Total number of people | | 184(139/45) | 204(147/56) | 387(286/101) |

Then, the sMRI data samples are analyzed and measured using FreeSurfer to obtain brain morphology indexes, and the brain morphology indexes are used to construct tabular data to obtain the original brain image dataset of the patients with schizophrenia.

A Brainnetome brain region template is selected for this embodiment. The Brainnetome brain region template is divided into a total of 246 brain regions, and then eight morphology indexes are extracted from each brain region of the template. After sample preprocessing, the following eight morphology indexes may be obtained for each brain region: surface area, gray matter volume, mean thickness, thickness standard deviation (thicknessstd), integral correction mean curvature (meancurv), integral correction Gaussian curvature (gauscurv), folding index (foldind), and intrinsic curvature index (curvind). The Brainnetome brain region template used in this embodiment is divided into a total of 246 regions, including 36 subcutaneous regions, and this embodiment only studies supra-cortical indexes, so a total of $210 \times 8 = 1680$ features are extracted from the Brainnetome brain region template.

In this embodiment, 77 samples of the original brain image dataset (387 samples in total) are classified as an independent test set, which does not participate in any training and is only used for testing the performance of a final model; and the remaining 310 samples are subjected to 5-fold division to obtain an original training set and an original validation set of each fold. Since each fold includes 62 samples, the original training set includes 248 samples, and the original validation set includes 62 samples. The sample distribution of the original training set and the original validation set of each fold is shown in Table 2, and the sample distribution of the original test set is shown in Table 3.

TABLE 2

Sample distribution of original training set and original validation set

| | | Training set | | | Validation set | | |
|---|---|---|---|---|---|---|---|
| | Dataset | COBRE | MCICShare | Sum | COBRE | MCICShare | Sum |
| Fold 1 | SZ/HC | 57/64 | 70/57 | 127/121 | 19/13 | 13/17 | 32/30 |
| | Total | 121 | 127 | 248 | 32 | 30 | 62 |
| Fold 2 | SZ/HC | 63/60 | 64/61 | 127/121 | 13/17 | 19/13 | 32/30 |
| | Total | 123 | 125 | 248 | 30 | 32 | 62 |
| Fold 3 | SZ/HC | 59/59 | 68/62 | 127/121 | 17/18 | 15/12 | 32/30 |
| | Total | 118 | 130 | 248 | 35 | 27 | 62 |
| Fold 4 | SZ/HC | 63/65 | 64/56 | 127/121 | 13/12 | 19/18 | 32/30 |
| | Total | 128 | 120 | 248 | 25 | 37 | 62 |
| Fold 5 | SZ/HC | 62/60 | 66/60 | 128/120 | 14/17 | 17/14 | 31/31 |
| | Total | 122 | 126 | 248 | 31 | 31 | 62 |

TABLE 3

Sample distribution of original test set

| | Test set | | |
|---|---|---|---|
| Dataset | COBRE | MCICShare | Sum |
| SZ/HC | 14/17 | 25/21 | 39/38 |
| Total | 31 | 46 | 77 |

S2: Construct a multi-objective function including an information loss before and after dataset discretization, a classification error rate, and a discrete data complexity.

In this embodiment, the expression of the multi-objective function is as follows:

$$\text{minimize}(f(R))=\text{minimize}(f_1(R),f_2(R),f_3(R))$$

where minimize(·) denotes a minimization operation, $f_1(R)$ denotes an objective function of the information loss before and after dataset discretization, $f_2(R)$ denotes an objective function of the classification error rate, $f_3(R)$ denotes an objective function of the discrete data complexity, $R=\{r_1, r_2, \ldots, r_i, \ldots r_m\}$ denotes a set of discrete intervals of all continuous attributes in the original brain image dataset, $r_i$ denotes the discrete intervals of an ith continuous attribute, and m denotes the number of the continuous attributes in the original brain image dataset.

In this embodiment, the information loss before and after dataset discretization is a difference between importance rankings of attributes before and after dataset discretization, and the objective function $f_1(R)$ of the information loss before and after dataset discretization is as follows:

$$f_1(R)=1-\text{NDCG}$$

where NDCG is a normalized discounted cumulative gain used to measure the difference between the importance rankings of the attributes before and after dataset discretization.

It should be understood that assuming that the importance of the attributes in the dataset remains the same before and after discretization, the importance rankings of the attributes before and after discretization are exactly the same. However, since the relative attribute importance of the same attribute in the dataset may change before and after discretization, the importance rankings of the attribute may be different before and after discretization. In this embodiment, the difference between the importance rankings of the attributes before and after discretization is calculated using NDCG to assess the information loss in the discretization process.

The step of acquiring the normalized discounted cumulative gain NDCG specifically includes:

calculate collective correlation coefficient values of all continuous attributes in the original brain image dataset;

construct, on the basis of the collective correlation coefficient values of all continuous attributes in the original brain image dataset, a set $RO^{(k)}=\{ro_1^{(k)}, \ldots, ro_i^{(k)}, \ldots ro_k^{(k)}\}$ of the importance rankings of first k continuous attributes in the original brain image dataset, where $ro_i^{(k)}$ denotes the importance ranking of an i th continuous attribute among the first k continuous attributes in the original brain image dataset;

discretize the original brain image dataset, and calculate collective correlation coefficient values of all discrete attributes in the discretized brain image dataset;

construct, on the basis of the collective correlation coefficient values of all discrete attributes in the discretized brain image dataset, a set $RD^{(k)}=\{rd_1^{(k)}, \ldots, rd_i^{(k)}, \ldots rd_k^{(k)}\}$ of importance rankings of first k discrete attributes in the discretized brain image dataset, where $rd_i^{(k)}$ denotes the importance ranking of an ith discrete attribute among the first k discrete attributes in the discretized brain image dataset;

calculate scores of the importance rankings of the first k continuous attributes in the original brain image dataset and the first k discrete attributes in the discretized brain image dataset respectively, with expressions being as follows:

$$IDCG^{(k)} = ro_1^{(k)} + \sum_{i=2}^{k^{(k)}} \frac{ro_i^{(k)}}{\log_2(i+1)}$$

$$DCG^{(k)} = rd_1^{(k)} + \sum_{i=2}^{k^{(k)}} \frac{rd_i^{(k)}}{\log_2(i+1)}$$

where $IDCG^{(k)}$ denotes the score of the importance rankings of the first k continuous attributes in the original brain image dataset, and $DCG^{(k)}$ denotes the score of the importance rankings of the first k discrete attributes in the discretized brain image dataset; and calculate the normalized discounted cumulative gain NDCG on the basis of the scores of the importance rankings of the first k continuous attributes in the original brain image dataset and the first k discrete attributes in the discretized brain image dataset, with the expression being as follows:

$$NDCG^{(k)} = \frac{DCG^{(k)}}{IDCG^{(k)}}$$

$$NDCG = \frac{\sum_{k=1}^{m} NDCG^{(k)}}{m}.$$

In this embodiment, the step of calculating the collective correlation coefficient values is as follows:

standardize the n*m dimensional original brain image dataset or the n*m dimensional discretized brain image dataset to obtain a standardized brain image dataset with the expression being as follows:

$$M_s = \left[ M - \frac{1}{n} MI \right] diag\left( \frac{1}{s_1} \frac{1}{s_2}, \dots, \frac{1}{s_i} \dots, \frac{1}{s_m} \right)$$

where n denotes the number of data samples, m denotes the number of continuous attributes or discrete attributes, $M_s$ denotes the standardized brain image dataset, M denotes the original brain image dataset or the discretized brain image dataset, I denotes an n*n dimensional matrix with each element equal to 1, diag($\cdot$) denotes a diagonal matrix, and a diagonal element $s_i$(i=1, 2, . . . , m) denotes a standard deviation of the ith continuous attribute or discrete attribute;

a correlation matrix of standardized sample data is a sample covariance matrix, and $R_M$ is set to denote a sample correlation matrix:

calculate the sample correlation matrix $R_M$ of the original brain image dataset or the discretized brain image dataset, with the expression being as follows:

$$R_M = \frac{1}{n-1} M_s^T M_s$$

where $M_s^T$ denotes the transpose of $M_s$;

sort feature values of the sample correlation matrix $R_M$ in descending order to obtain a feature sequence $\lambda_1$, $\lambda_2$, . . . , $\lambda_i$, . . . , $\lambda_m$ and feature vectors $u_1$, $u_2$, . . . , $u_i$, . . . $u_m$ corresponding to the feature sequence; and calculate the collective correlation coefficient values $\rho_{Y,q_j}$ of the continuous attributes or the discrete attributes on the basis of the feature sequence or the feature vectors, with the expression being as follows:

$$\rho_{Y,q_j} = \sum_{i=1}^{m} h_i |\rho_{Y_i,q_j}| = \sum_{i=1}^{m} \frac{h_i |u_{ji}| \sqrt{\lambda_i}}{\sqrt{\sigma_j}}$$

where $Y_i$ denotes an ith principal component, $q_j$ denotes a jth continuous attribute or discrete attribute in the original brain image dataset or the discretized brain image dataset, $h_i$ denotes the contribution of a variance of the ith principal component to a total variance, $u_{ji}$ denotes an ith element of a jth feature vector, and $\sigma_j$ denotes a variance of the jth continuous attribute or discrete attribute.

In this embodiment, the constructing, on the basis of the collective correlation coefficient values of all continuous attributes in the original brain image dataset, a set $RO^{(k)}$ of the importance rankings of first k continuous attributes in the original brain image dataset specifically includes steps of:

discretize the collective correlation coefficient values of all continuous attributes in the original brain image dataset to obtain discretization collective correlation coefficient values;

sort, on the basis of the discretization collective correlation coefficient values, the continuous attributes in the original brain image dataset in descending order according to the discretization collective correlation coefficient values of the continuous attributes to obtain a descending sequence of continuous attributes;

assign an integer score value to each continuous attribute in the descending sequence of continuous attributes to obtain a set RO of the importance rankings of all continuous attributes, where the smaller the discretization collective correlation coefficient value corresponding to a continuous attribute is, the smaller the score value assigned to the continuous attribute is, and when different continuous attributes correspond to a same discretization collective correlation coefficient value, the different continuous attributes are assigned with the same score; and construct $RO^{(k)}$ by taking the first k continuous attributes from the set of importance rankings of all continuous attributes.

The constructing, on the basis of the collective correlation coefficient values of all discrete attributes in the discretized brain image dataset, a set $RD^{(k)}$ of importance rankings of first k discrete attributes in the discretized brain image dataset specifically includes steps of:

sort, on the basis of the collective correlation coefficient values of all discrete attributes in the discretized brain image dataset, the discrete attributes in the discretized brain image dataset in descending order according to the collective correlation coefficient values of the discrete attributes to obtain a descending sequence of discrete attributes;

assign the discrete attributes in the descending sequence of discrete attributes with the same integer score value as corresponding continuous attributes in the original brain image dataset to obtain a set RD of the importance rankings of all discrete attributes; and construct $RD^{(k)}$ by taking the first k discrete attributes from the set of importance rankings of all discrete attributes.

In this embodiment, the expression of the objective function $f_2(R)$ of the classification error rate is as follows:

$$f_2(R) = \frac{\delta_{CART} + \delta_{KNN}}{2}$$

where $\delta_{CART}$ denotes a ratio of the number of misclassified samples to the total number of samples after the discretized brain image dataset has been applied to a classification model CART, and $\delta_{KNN}$ denotes a ratio of the number of misclassified samples to the total number of samples after the discretized brain image dataset has been applied to K-Nearest Neighbors (KNN) classifier model.

The objective function $f_3(R)$ of the discrete data complexity counts the discrete intervals of continuous attributes with the discrete intervals being not 1 in the original brain image dataset, with the expression being as follows:

$$f_3(R) = \sum_{i=1}^{m} r_i[r_i == 1], \quad \text{where } [r_i == 1] = \begin{cases} 0, & \text{if } r_i = 1 \\ 1, & \text{otherwise} \end{cases}.$$

It should be understood that the simpler the data discretization result, the more it shows that the discretized data may clearly reflect the characteristics of the data, and is very readable and easy to understand. In addition, the simplicity of a discretization scheme may also affect the execution speed of subsequent classification tasks.

S3: Search for an optimal solution of the multi-objective function using the original training set and the original validation set to obtain a discretization scheme.

In order to obtain the optimal discrete interval corresponding to each attribute in the original brain image dataset, the set of the discrete intervals of the attributes is coded into chromosomes in an evolutionary multi-objective optimization algorithm, and is then heuristically searched. In this embodiment, the multi-objective function is heuristically searched using a non-dominated sorting genetic algorithm NSGA-II to construct the discretization scheme, specifically including the following steps:

S3.1: Initialize a population and code of the non-dominated sorting genetic algorithm, where each chromosome in the population includes the discrete intervals of all continuous attributes in the original brain image dataset, the code is a positional code, and an ith gene in the positional code denotes the discrete intervals of the ith continuous attribute.

S3.2: Assess the chromosome individuals by means of the multi-objective function to calculate a fitness value of each chromosome in the population.

S3.3: Divide the population into a plurality of non-dominated layers of different levels on the basis of the fitness values according to a Pareto dominance criterion, and calculate a crowding distance of chromosomes of each non-dominated layer with respect to neighboring chromosomes located on a non-dominated layer of the same level, where the plurality of non-dominated layers of different levels have the following dominance relationship: a solution of an nth non-dominated layer is dominated by solutions of previous n−1 non-dominated layers.

S3.4: Screen to obtain N parent chromosomes on the basis of the levels of the non-dominated layers and the crowding distances, and create a mating pool using the parent chromosomes.

S3.5: Perform crossover and mutation operations on the parent chromosomes in the mating pool and introduce an elite selection strategy to obtain a child chromosome population with a size of N.

S3.6: Iteratively perform S3.4-S3.5 until the number of iterations reaches a threshold, so as to obtain an optimal solution set of the multi-objective function, and construct the discretization scheme by using the optimal solution set.

In this embodiment, S3.4 specifically includes the following steps:

S3.4.1: Randomly combine N chromosomes in an initial population in pairs to produce N/2 pairs of candidate chromosome combinations.

S3.4.2: Screen the N/2 pairs of candidate chromosome combinations to obtain N/2 winner chromosomes by performing the following operations:

(1) for all candidate chromosome combinations, select chromosomes in non-dominated layers of low levels as the winner chromosomes;

(2) when two chromosomes in a candidate chromosome combination are in the non-dominated layers of the same level, select a chromosome having a larger crowding distance as the winner chromosome;

(3) when two chromosomes in a candidate chromosome combination are in the non-dominated layers of the same level and have the same crowding distance, randomly select a chromosome as the winner chromosome;

S3.4.3: Perform S3.4.1-S3.4.2 one more time to obtain N/2 winner chromosomes again by screening, so as to obtain N winner chromosomes in total.

S3.4.4: Set the N winner chromosomes as the parent chromosomes, and create the mating pool using the parent chromosomes.

S3.5: Perform crossover and mutation operations on the parent chromosomes in the mating pool to obtain a child chromosome population with a size of N.

In this embodiment, S3.5 specifically includes the following steps:

S3.5.1: Perform crossover and mutation operations on the parent chromosomes in the mating pool to generate N child chromosomes.

S3.5.2: Combine the generated child chromosomes with the parent chromosomes to form a new candidate population.

S3.5.3: Divide the chromosome individuals in the new candidate population into a plurality of non-dominated layers of different levels according to a dominance relationship.

S3.5.4: Calculate crowding distances of chromosome individuals in each non-dominated layer;

S3.5.5: Select N chromosomes on the basis of the levels of the non-dominated layers and the crowding distances to obtain the child chromosome population with the size of N.

S4: Discretize the original training set, the original validation set and the original test set according to the discretization scheme, respectively, to obtain a discrete training set, a discrete validation set, and a discrete test set.

In this embodiment, the original dataset is discretized using a Lloyd-Max quantizer.

It will be appreciated that the Lloyd-Max quantizer approximates original continuous values with finite discrete values under the condition that a mean square error between the original continuous values and the discrete values is minimized. Inputs of the Lloyd-Max quantizer are an attribute in the original dataset and the discrete intervals corresponding to the attribute in the original dataset, and outputs are cut-points and the corresponding discrete values.

S5: Perform feature selection on the discrete training set and the discrete validation set, and perform feature reduction on the discrete training set and the discrete test set using a feature selection result to obtain a reduced discrete training set and a reduced discrete test set. S5 specifically includes the following steps:

S5.1: Calculate Pearson correlation coefficients of each column of brain region features in the discrete training set and the discrete validation set.

S5.2: Sort each column of brain region features in the discrete training set and the discrete validation set in descending order according to absolute values of the Pearson correlation coefficients of the column of brain region features, and select first b features as a key brain region feature candidate set, where b is a hyper-parameter determined by grid search.

S5.3: Perform feature selection in the key brain region feature candidate set using a genetic algorithm to obtain a key brain region feature set.

S5.4: Perform feature reduction on the discrete training set and the discrete test set using the key brain region feature set, respectively, to obtain the reduced discrete training set and the reduced discrete test set.

In this embodiment, in order to avoid the problem of data leakage, the original training set is discretized, the obtained optimal solution set is applied to the original validation set, a solution with the highest classification accuracy in the original validation set is selected as the discretization scheme, and the discretization scheme is used to discretize the original training set in and the original validation set in and the independent original test set in each fold separately. After processing of the above data discretization operation, five different discrete training sets, discrete validation sets and discrete test sets are obtained respectively. The datasets obtained by processing are then classified in conjunction with a classification algorithm with feature selection. In the above classification algorithm with feature selection, the discrete test set is used to test a classification effect (77 samples) of the final key brain region feature set, the discrete training set and the discrete validation set are used for feature selection and training of the classifier (310 samples), and in order to avoid data leakage during classification experiments, no data of the test set is used for feature selection.

S6: Train a classifier using the reduced discrete training set, and input the reduced discrete test set into the trained classifier for classification to obtain a brain image data classification result.

In this embodiment, the classifier used is an SVM classifier, an RBF kernel function is selected, and a penalty coefficient is 1.0.

In the specific implementation process, the Pearson correlation coefficients of each column of features are first calculated using features and labels of the discrete training set and the discrete validation set (310 samples), the features are subjected to attention weighting to form a new attention dataset, and the features are sorted in descending order according to the absolute value of the Pearson correlation coefficient, and the number of candidate features is determined by grid search to form the key brain region feature candidate set. The individual fitness value is then calculated using the genetic algorithm on the basis of the average classification accuracy and feature length of the SVM classifier trained by the discrete training set on the discrete validation set, and after reaching the maximum number of iterations, the key brain region feature set selected using the genetic algorithm is obtained. Finally, feature reduction is performed on the discrete training set and the discrete test set using the key brain region feature set separately to obtain the reduced discrete training set and the reduced discrete test set. The SVM classifier is trained by the reduced discrete training set, the reduced discrete test set is tested, and finally 5-fold results are averaged to obtain the final classification result of the algorithm.

TABLE 4

Performance comparison of data on brain image classification algorithm
with feature selection before and after discretization

| Before discretization | ACC | AUC | F1 | After discretization | ACC | AUC | F1 |
|---|---|---|---|---|---|---|---|
| 1 | 0.7336 | 0.7817 | 0.7360 | 1 | 0.7480 | 0.7916 | 0.7400 |
| 2 | 0.7454 | 0.7851 | 0.7446 | 2 | 0.7532 | 0.7939 | 0.7502 |
| 3 | 0.7402 | 0.7709 | 0.7414 | 3 | 0.7584 | 0.7945 | 0.7554 |
| 4 | 0.7350 | 0.7792 | 0.7334 | 4 | 0.7506 | 0.8070 | 0.7507 |
| 5 | 0.7350 | 0.7829 | 0.7331 | 5 | 0.7480 | 0.6786 | 0.7430 |
| 6 | 0.7324 | 0.7941 | 0.7331 | 6 | 0.7558 | 0.8062 | 0.7547 |
| 7 | 0.7402 | 0.7821 | 0.7409 | 7 | 0.7480 | 0.7968 | 0.7419 |
| 8 | 0.7324 | 0.7802 | 0.7377 | 8 | 0.7480 | 0.7903 | 0.7410 |
| 9 | 0.7402 | 0.7923 | 0.7394 | 9 | 0.7506 | 0.7930 | 0.7475 |
| 10 | 0.7220 | 0.7731 | 0.7183 | 10 | 0.7636 | 0.6793 | 0.7593 |
| Variance | 0.006409 | 0.007274 | 0.007288 | Variance | 0.005350 | 0.049955 | 0.006779 |
| Mean | 0.7356 | 0.7821 | 0.7357 | Mean | 0.7524 | 0.7731 | 0.7483 |

After ten 5-fold cross-validations, the ACC, AUC, F1 indexes obtained on the test set are shown in Table 4. Compared with the direct use of the original brain image dataset combined with the classification algorithm with feature selection, the brain image dataset obtained by discretization processing may obtain higher ACC and F1 values. Meanwhile, by analyzing brain regions where these features are located in the key feature set, brain regions with significant classification features may be identified, which helps to reveal more effective and objective brain region information.

Embodiment 3

Figure 3:
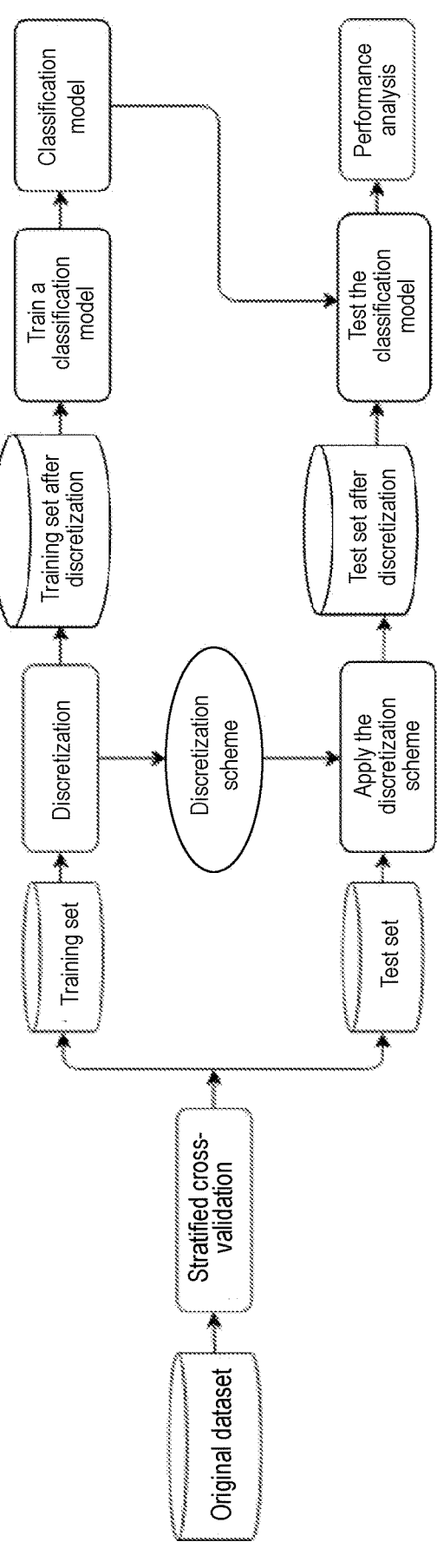
FIG. 3 is a schematic flow diagram of comparison experiments in Embodiment 3.
Figure 4:
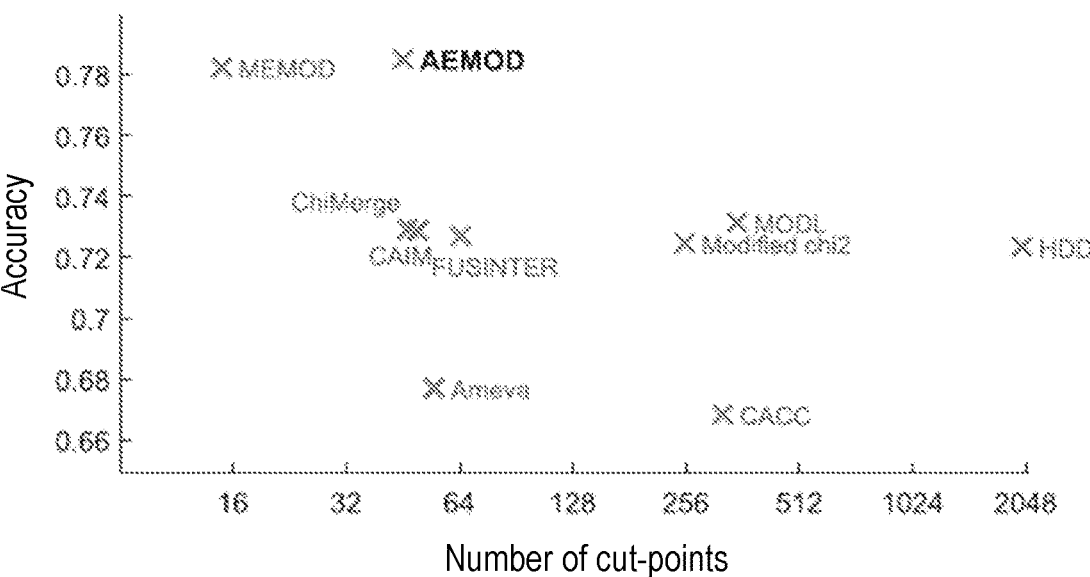
FIG. 4 shows comparison results between average classification accuracy and the average number of cut-points of different discretization algorithms on a classification model CART in Embodiment 3.
Figure 5:
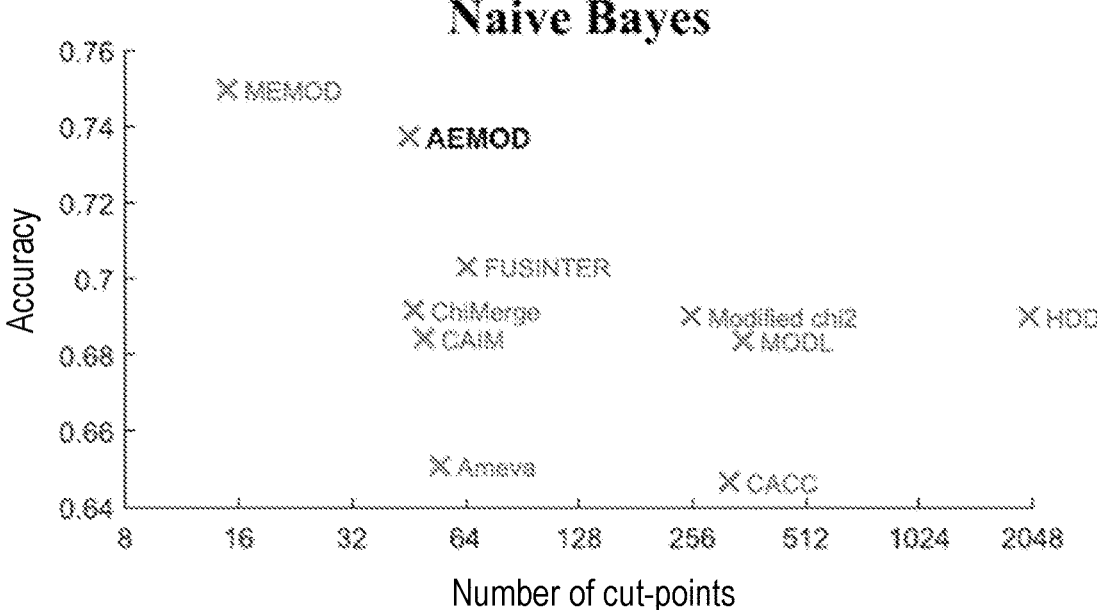
FIG. 5 shows comparison results between average classification accuracy and the average number of cut-points of different discretization algorithms on a classification model Naive Bayes in Embodiment 3.
Figure 6:
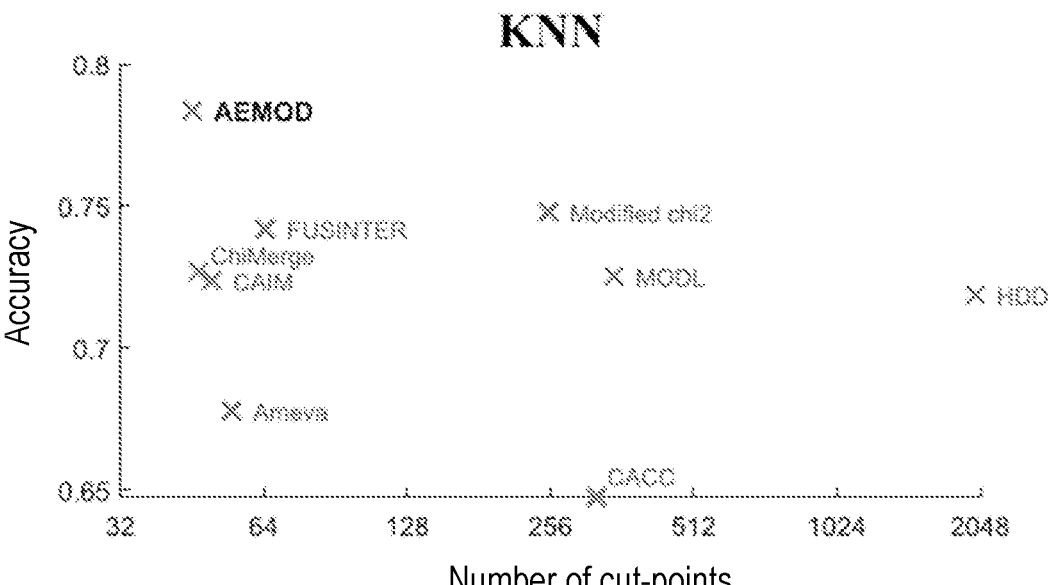
FIG. 6 shows comparison results between average classification accuracy and the average number of cut-points of different discretization algorithms on K-Nearest Neighbors (KNN) classifier model in Embodiment 3.
Figure 7:
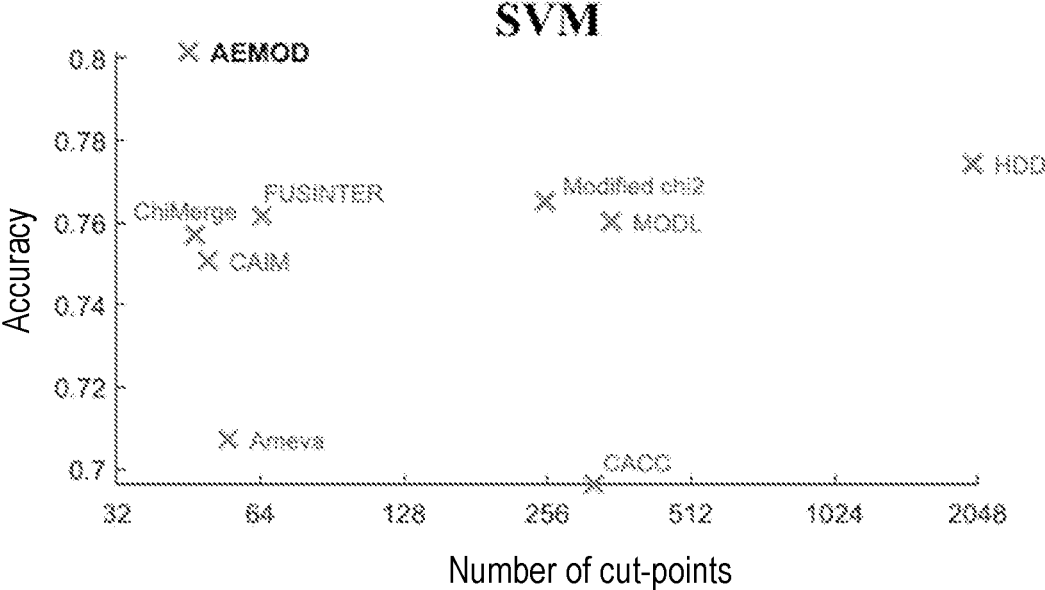
FIG. 7 shows comparison results between average classification accuracy and the average number of cut-points of different discretization algorithms on a classification model SVM in Embodiment 3.

Referring to FIG. 3, on the basis of the brain image classification method based on discretized data according to Embodiment 2, this embodiment, taking 20 real datasets in a UCI database as an example, selects eight relevant discretization algorithms, namely, Ameva, CACC, CAIM, ChiMerge, FUSINTER, HDD, Modified Chi2, and MODL, to conduct comparative experiments with the discretization scheme search method (referred to as an AEMOD algorithm in this embodiment) mentioned in Embodiment 2, to compare the number of cut-points produced by different discretization algorithms after discretizing attributes and classification accuracy on subsequent four classical classification models, namely, CART, KNN, Naive Bayes, and SVM. The classification models Naive Bayes and SVM are not included in the objective function of the AEMOD algorithm, so as to assess the generalization ability of the obtained discretization scheme. Meanwhile, experimental results of the AEMOD algorithm are compared with those of another evolutionary multi-objective discretization algorithm, MEMOD, where the experimental part of the algorithms uses the same UCI dataset, data partitioning method and classification models (CART and Naive Bayes). In addition, to further validate the effectiveness of the AEMOD algorithm, different discretization algorithms were combined with CatBoost, the current state-of-the-art GBDT algorithm, and the performance of data on the CatBoost classification model before and after discretization was compared.

In this embodiment, the AEMOD algorithm is implemented using MATLAB, and the other discretization algorithms (except MEMOD) used as comparisons are run through KEEL data mining software. In the classification models, CatBoost is implemented using open source, and the rest is implemented using the sklearn package in Python. In order to obtain more stable and reliable results, this embodiment uses stratified 10-fold cross-validation to divide the dataset, thereby ensuring that each fold of data has the same class attribute ratio as the original dataset, and generating the training set and the test set at a ratio of 9:1. In each experiment, the training set was discretized, and the obtained discretization scheme was applied to the test set. Each discretization algorithm was subjected to 10 experiments respectively, and the number of cut-points and the classification accuracy were averaged over the 10 experiments. During the experiments, the specific algorithm features, dataset features, and parameter settings for the classification model and the discretization algorithms are shown in Table 5, Table 6, and Table 7.

TABLE 5

Features of the present invention and other discretization algorithms used as comparisons

| Discretization algorithm | Split/merge/ mix | Supervised/ unsupervised | Global/ local | Single-attribute/multi-attribute |
|---|---|---|---|---|
| Ameva | Split | Supervised | Global | Single-attribute |
| CACC | Split | Supervised | Global | Single-attribute |
| CAIM | Split | Supervised | Global | Single-attribute |
| ChiMerge | Merge | Supervised | Global | Single-attribute |
| FUSINTER | Merge | Supervised | Global | Single-attribute |
| HDD | Split | Supervised | Global | Multi-attribute |
| Modified Chi2 | Merge | Supervised | Global | Single-attribute |
| MODL | Merge | Supervised | Global | Single-attribute |
| MEMOD | Mix | Supervised | Global | Multi-attribute |
| AEMOD | Split | Supervised | Global | Multi-attribute |

TABLE 5-continued

Features of the present invention and other discretization algorithms used as comparisons

| Discretization algorithm | Split/merge/ mix | Supervised/ unsupervised | Global/ local | Single-attribute/multi-attribute |
|---|---|---|---|---|

TABLE 6

Features of UCI dataset

| Dataset | Number of samples | Number of attributes | Number of attributes | Number of discrete attributes | Number of categories |
|---|---|---|---|---|---|
| Abalone | 4174 | 8 | 7 | 1 | 28 |
| Appendicitis | 106 | 7 | 7 | 0 | 2 |
| Balance | 625 | 4 | 4 | 0 | 3 |
| Bupa | 345 | 6 | 6 | 0 | 2 |
| Contraceptive | 1473 | 9 | 9 | 0 | 3 |
| Glass | 214 | 9 | 9 | 0 | 7 |
| Haberman | 306 | 3 | 3 | 0 | 2 |
| Iris | 150 | 4 | 4 | 0 | 3 |
| Penbased | 10992 | 16 | 16 | 0 | 10 |
| Phoneme | 5404 | 5 | 5 | 0 | 2 |
| Pima | 768 | 8 | 8 | 0 | 2 |
| Saheart | 462 | 9 | 8 | 1 | 2 |
| Satimage | 6435 | 36 | 36 | 0 | 7 |
| Sonar | 208 | 60 | 60 | 0 | 2 |
| Tae | 151 | 5 | 5 | 0 | 3 |
| Transfusion | 748 | 4 | 4 | 0 | 2 |
| Vehicle | 846 | 18 | 18 | 0 | 4 |
| Vowel | 990 | 13 | 13 | 0 | 11 |
| Wine | 178 | 13 | 13 | 0 | 3 |
| Yeast | 1484 | 8 | 8 | 0 | 10 |

TABLE 7

Parameter settings for classification model and each discretization algorithm

| Method | Parameter |
|---|---|
| KNN | Number of nearest neighbours = 10, Euclidean distance |
| SVM | Penalty coefficient = 1.0, RBF kernel |
| CatBoost | Maximum number of trees = 100, tree depth = 8, learning rate = 0.03 |
| ChiMerge | Confidence threshold = 0.5 |
| FUSINTER | $\alpha = 0.975$, $\lambda = 1$ |
| HDD | R = 0.8 |
| MODL | Optimal process type |
| AEMOD | Population size = 200, number of iterations = 300, crossover probability = 0.8, mutation probability = 0.2 |

TABLE 8

Number of cut-points obtained by different discretization algorithms

| | Ameva | CACC | CAIM | ChiMerge | FUSINTER | HDD | Modified Chi2 | MODL | MEMOD | AEMOD |
|---|---|---|---|---|---|---|---|---|---|---|
| abalone | 189 | 27 | 189 | 144 | 26 | 5802 | 2864 | 380 | 22 | 17 |
| appendicitis | 7 | 8 | 7 | 7 | 15 | 7 | 37 | 65 | 2 | 6 |
| balance | 8 | 4 | 8 | 8 | 12 | 10 | 14 | 8 | 9 | 16 |
| bupa | 10 | 32 | 6 | 6 | 33 | 312 | 95 | 49 | 11 | 16 |
| contraceptive | 18 | 13 | 15 | 15 | 22 | 62 | 40 | 15 | 8 | 16 |
| glass | 54 | 0 | 54 | 52 | 14 | 292 | 56 | 34 | 15 | 28 |
| haberman | 6 | 10 | 3 | 3 | 9 | 87 | 45 | 9 | 3 | 3 |
| iris | 8 | 7 | 8 | 8 | 10 | 28 | 28 | 10 | 3 | 6 |
| penbased | 144 | 39 | 144 | 144 | 131 | 1591 | 145 | 159 | 42 | 104 |

TABLE 8-continued

Number of cut-points obtained by different discretization algorithms

| | Ameva | CACC | CAIM | ChiMerge | FUSINTER | HDD | Modified Chi2 | MODL | MEMOD | AEMOD |
|---|---|---|---|---|---|---|---|---|---|---|
| phoneme | 6 | 8 | 5 | 5 | 53 | 10661 | 668 | 2096 | 22 | 32 |
| pima | 11 | 139 | 8 | 8 | 37 | 1188 | 104 | 226 | 7 | 19 |
| saheart | 11 | 306 | 8 | 8 | 48 | 1622 | 62 | 381 | 6 | 8 |
| satimage | 216 | 0 | 216 | 216 | 321 | 840 | 321 | 367 | 36 | 228 |
| sonar | 103 | 1851 | 60 | 60 | 353 | 7471 | 22 | 93 | 10 | 163 |
| tae | 14 | 48 | 8 | 8 | 14 | 94 | 70 | 30 | 9 | 10 |
| transfusion | 6 | 22 | 4 | 4 | 9 | 161 | 86 | 29 | 5 | 9 |
| vehicle | 54 | 49 | 54 | 54 | 90 | 1376 | 186 | 117 | 18 | 93 |
| vowel | 131 | 3767 | 112 | 100 | 36 | 7426 | 58 | 2813 | 43 | 84 |
| wine | 26 | 18 | 26 | 26 | 43 | 538 | 13 | 65 | 3 | 26 |
| yeast | 72 | 45 | 57 | 55 | 12 | 397 | 149 | 19 | 24 | 20 |
| MEAN | 54.70 | 319.65 | 49.60 | 46.55 | 64.40 | 1998.25 | 253.15 | 348.25 | 14.90 | 45.20 |

TABLE 9

Classification accuracy of different discretization algorithms on classification model CART

| | Ameva | | CACC | | CAIM | | ChiMerge | | FUSINTER | |
|---|---|---|---|---|---|---|---|---|---|---|
| | Avg | Std-Dev | Avg | Std-Dev | Avg | Std-Dev | Avg | Std-Dev | Avg | Std-Dev |
| abalone | 0.2256 | 0.0164 | 0.2385 | 0.0181 | 0.2378 | 0.0216 | 0.2338 | 0.0223 | 0.3636 | 0.0115 |
| appendicitis | 0.8448 | 0.1157 | 0.8448 | 0.1157 | 0.8448 | 0.1157 | 0.8621 | 0.0905 | 0.8224 | 0.1021 |
| balance | 0.7550 | 0.0380 | 0.7006 | 0.0113 | 0.7550 | 0.0330 | 0.8223 | 0.0459 | 0.8801 | 0.0384 |
| bupa | 0.6841 | 0.0515 | 0.6809 | 0.0525 | 0.6608 | 0.0469 | 0.6492 | 0.0682 | 0.6428 | 0.0720 |
| contraceptive | 0.4888 | 0.0159 | 0.5037 | 0.0170 | 0.5099 | 0.0185 | 0.5024 | 0.0287 | 0.5098 | 0.0317 |
| glass | 0.4982 | 0.0602 | 0.3557 | 0.0151 | 0.7259 | 0.0999 | 0.6993 | 0.0905 | 0.7085 | 0.1200 |
| haberman | 0.7478 | 0.0269 | 0.7382 | 0.0325 | 0.7613 | 0.0352 | 0.7481 | 0.0324 | 0.7511 | 0.0441 |
| iris | 0.9533 | 0.0632 | 0.9533 | 0.0632 | 0.9533 | 0.0632 | 0.9533 | 0.0632 | 0.9333 | 0.0544 |
| penbased | 0.9571 | 0.0069 | 0.9463 | 0.0090 | 0.9616 | 0.0089 | 0.9608 | 0.0078 | 0.9608 | 0.0097 |
| phoneme | 0.7926 | 0.0081 | 0.7987 | 0.0381 | 0.7957 | 0.0045 | 0.7885 | 0.0094 | 0.8701 | 0.0138 |
| pima | 0.7109 | 0.0371 | 0.7097 | 0.0277 | 0.7345 | 0.0294 | 0.7305 | 0.0429 | 0.7279 | 0.0244 |
| saheart | 0.6602 | 0.0644 | 0.6450 | 0.0486 | 0.7098 | 0.0303 | 0.6970 | 0.0290 | 0.6454 | 0.0714 |
| satimage | 0.2513 | 0.0034 | 0.2382 | 0.0306 | 0.8501 | 0.0166 | 0.8588 | 0.0100 | 0.8558 | 0.0099 |
| sonar | 0.7254 | 0.0700 | 0.7258 | 0.0904 | 0.7742 | 0.0865 | 0.7596 | 0.1197 | 0.7410 | 0.1096 |
| tae | 0.5263 | 0.1630 | 0.5661 | 0.1203 | 0.5459 | 0.0844 | 0.5602 | 0.1523 | 0.5265 | 0.2087 |
| transfusion | 0.7947 | 0.0345 | 0.7853 | 0.0270 | 0.7695 | 0.0123 | 0.7680 | 0.0205 | 0.7706 | 0.0283 |
| vehicle | 0.6463 | 0.0447 | 0.6938 | 0.0309 | 0.6955 | 0.0457 | 0.6939 | 0.0411 | 0.6954 | 0.0288 |
| vowel | 0.7838 | 0.0552 | 0.7737 | 0.0507 | 0.7919 | 0.0675 | 0.7818 | 0.0630 | 0.7929 | 0.0351 |
| wine | 0.9218 | 0.0378 | 0.9270 | 0.0265 | 0.9264 | 0.0531 | 0.9388 | 0.0487 | 0.9431 | 0.0371 |
| yeast | 0.5639 | 0.0438 | 0.5414 | 0.0406 | 0.5726 | 0.0376 | 0.5786 | 0.0415 | 0.5787 | 0.0386 |
| MEAN | 0.6770 | 0.0480 | 0.6683 | 0.0413 | 0.7288 | 0.0458 | 0.7294 | 0.0514 | 0.7270 | 0.0545 |

| | HDD | | Modified Chi2 | | MODL | | MEMOD | | AEMOD | |
|---|---|---|---|---|---|---|---|---|---|---|
| | Avg | Std-Dev | Avg | Std-Dev | Avg | Std-Dev | Avg | Std-Dev | Avg | Std-Dev |
| abalone | 0.2103 | 0.0129 | 0.2225 | 0.0199 | 0.2486 | 0.0216 | 0.2829 | 0.0192 | 0.2820 | 0.0066 |
| appendicitis | 0.8448 | 0.1157 | 0.8786 | 0.0699 | 0.8488 | 0.0828 | 0.9064 | 0.0979 | 0.9470 | 0.0603 |
| balance | 0.7803 | 0.0378 | 0.7888 | 0.0162 | 0.8048 | 0.0342 | 0.7839 | 0.0328 | 0.8432 | 0.0360 |
| bupa | 0.6633 | 0.1153 | 0.6601 | 0.0639 | 0.6687 | 0.0814 | 0.7316 | 0.0544 | 0.7128 | 0.0315 |
| contraceptive | 0.5254 | 0.0369 | 0.5138 | 0.0279 | 0.5295 | 0.0222 | 0.5585 | 0.0339 | 0.5763 | 0.0174 |
| glass | 0.7365 | 0.0800 | 0.6985 | 0.0996 | 0.7044 | 0.0792 | 0.7815 | 0.1111 | 0.7741 | 0.0712 |
| haberman | 0.6889 | 0.0590 | 0.7057 | 0.0501 | 0.7221 | 0.0355 | 0.7845 | 0.0303 | 0.7642 | 0.0331 |
| iris | 0.9533 | 0.0632 | 0.9600 | 0.0466 | 0.9600 | 0.0562 | 0.9733 | 0.0466 | 0.9733 | 0.0466 |
| penbased | 0.9570 | 0.0112 | 0.9608 | 0.0108 | 0.9560 | 0.0067 | 0.9501 | 0.0046 | 0.9692 | 0.0102 |
| phoneme | 0.3682 | 0.0162 | 0.8727 | 0.0175 | 0.8712 | 0.0150 | 0.8538 | 0.0087 | 0.8771 | 0.0130 |
| pima | 0.7304 | 0.0434 | 0.7461 | 0.0234 | 0.7395 | 0.0494 | 0.7734 | 0.0311 | 0.7916 | 0.0264 |
| saheart | 0.6170 | 0.0411 | 0.6128 | 0.0850 | 0.6580 | 0.0735 | 0.7250 | 0.0618 | 0.7423 | 0.0396 |
| satimage | 0.8476 | 0.0169 | 0.8588 | 0.0149 | 0.8572 | 0.0137 | 0.8614 | 0.0148 | 0.8777 | 0.0064 |
| sonar | 0.7353 | 0.0995 | 0.7551 | 0.0929 | 0.7104 | 0.0955 | 0.9083 | 0.0484 | 0.8792 | 0.0622 |
| tae | 0.5936 | 0.1498 | 0.5530 | 0.1256 | 0.5861 | 0.1448 | 0.8807 | 0.0871 | 0.6918 | 0.1301 |
| transfusion | 0.7312 | 0.0488 | 0.7620 | 0.0459 | 0.7880 | 0.0340 | 0.8048 | 0.0340 | 0.8093 | 0.0320 |
| vehicle | 0.7164 | 0.0345 | 0.6891 | 0.0369 | 0.6985 | 0.0313 | 0.7245 | 0.0247 | 0.7695 | 0.0290 |
| vowel | 0.7929 | 0.0618 | 0.7838 | 0.0634 | 0.7788 | 0.0594 | 0.7960 | 0.0420 | 0.8313 | 0.0317 |
| wine | 0.9205 | 0.0606 | 0.9330 | 0.0573 | 0.9326 | 0.0350 | 0.9608 | 0.0758 | 0.9889 | 0.0234 |
| yeast | 0.5351 | 0.0474 | 0.5376 | 0.0479 | 0.5658 | 0.0386 | 0.5963 | 0.0081 | 0.5994 | 0.0303 |
| MEAN | 0.7234 | 0.0577 | 0.7246 | 0.0537 | 0.7315 | 0.0505 | 0.7824 | 0.0449 | 0.7851 | 0.0364 |

TABLE 10

Classification accuracy of different discretization algorithms on classification model Naive Bayes

| | Ameva | | CACC | | CAIM | | ChiMerge | | FUSINTER | |
|---|---|---|---|---|---|---|---|---|---|---|
| | Avg | Std-Dev | Avg | Std-Dev | Avg | Std-Dev | Avg | Std-Dev | Avg | Std-Dev |
| abalone | 0.1651 | 0.0000 | 0.1894 | 0.0113 | 0.2351 | 0.0124 | 0.2223 | 0.0014 | 0.2171 | 0.0117 |
| appendicitis | 0.8739 | 0.1100 | 0.8739 | 0.1100 | 0.8339 | 0.1032 | 0.8023 | 0.0194 | 0.8439 | 0.0929 |
| balance | 0.8001 | 0.0348 | 0.7373 | 0.0291 | 0.8001 | 0.0348 | 0.3545 | 0.0266 | 0.8864 | 0.0218 |
| bupa | 0.6665 | 0.0612 | 0.6811 | 0.0476 | 0.6231 | 0.0348 | 0.6352 | 0.0699 | 0.6579 | 0.0650 |
| contraceptive | 0.4609 | 0.0279 | 0.4650 | 0.0246 | 0.4712 | 0.0287 | 0.5281 | 0.0287 | 0.5071 | 0.0307 |
| glass | 0.4499 | 0.0118 | 0.3557 | 0.0143 | 0.5967 | 0.0774 | 0.5933 | 0.1665 | 0.5864 | 0.0750 |
| haberman | 0.7446 | 0.0119 | 0.7353 | 0.0047 | 0.2356 | 0.0161 | 0.7353 | 0.0047 | 0.7573 | 0.0395 |
| iris | 0.9400 | 0.0554 | 0.9333 | 0.0516 | 0.9333 | 0.0657 | 0.9400 | 0.0554 | 0.9400 | 0.0629 |
| penbased | 0.8114 | 0.0145 | 0.8268 | 0.0081 | 0.8445 | 0.0112 | 0.8457 | 0.0101 | 0.8495 | 0.0107 |
| phoneme | 0.7752 | 0.0089 | 0.7702 | 0.0116 | 0.7861 | 0.0044 | 0.7779 | 0.0129 | 0.7816 | 0.0053 |
| pima | 0.7135 | 0.0176 | 0.7279 | 0.0205 | 0.7332 | 0.0425 | 0.7305 | 0.0329 | 0.7579 | 0.0097 |
| saheart | 0.7142 | 0.0403 | 0.7035 | 0.0465 | 0.7166 | 0.0416 | 0.7163 | 0.0354 | 0.7079 | 0.0329 |
| satimage | 0.2514 | 0.0061 | 0.2382 | 0.0005 | 0.7826 | 0.0139 | 0.7920 | 0.0132 | 0.7859 | 0.0141 |
| sonar | 0.7835 | 0.0587 | 0.7635 | 0.0767 | 0.7311 | 0.0738 | 0.7682 | 0.0637 | 0.7751 | 0.0982 |
| tae | 0.5141 | 0.1019 | 0.5313 | 0.0907 | 0.5319 | 0.0981 | 0.5325 | 0.0753 | 0.5309 | 0.1215 |
| transfusion | 0.7614 | 0.0119 | 0.7655 | 0.0115 | 0.7628 | 0.0157 | 0.7600 | 0.0130 | 0.7641 | 0.0120 |
| vehicle | 0.6147 | 0.0251 | 0.5832 | 0.0611 | 0.5686 | 0.0440 | 0.6268 | 0.0481 | 0.5912 | 0.0391 |
| vowel | 0.6232 | 0.0611 | 0.6525 | 0.0431 | 0.6384 | 0.0465 | 0.6505 | 0.0427 | 0.6121 | 0.0548 |
| wine | 0.9382 | 0.0599 | 0.9372 | 0.0544 | 0.9608 | 0.0357 | 0.9385 | 0.0684 | 0.9715 | 0.0285 |
| yeast | 0.4149 | 0.0356 | 0.4606 | 0.0288 | 0.3764 | 0.0274 | 0.3858 | 0.0233 | 0.5417 | 0.0388 |
| MEAN | 0.6508 | 0.0399 | 0.6466 | 0.0373 | 0.6844 | 0.0413 | 0.6918 | 0.0406 | 0.7038 | 0.0448 |

| | HDD | | Modified Chi2 | | MODL | | MEMOD | | AEMOD | |
|---|---|---|---|---|---|---|---|---|---|---|
| | Avg | Std-Dev | Avg | Std-Dev | Avg | Std-Dev | Avg | Std-Dev | Avg | Std-Dev |
| abalone | 0.2375 | 0.0096 | 0.2223 | 0.0123 | 0.2068 | 0.0056 | 0.2650 | 0.0134 | 0.2595 | 0.0059 |
| appendicitis | 0.8539 | 0.1032 | 0.8541 | 0.1070 | 0.8739 | 0.1100 | 0.9045 | 0.0634 | 0.9295 | 0.0194 |
| balance | 0.8354 | 0.0425 | 0.8960 | 0.0205 | 0.8195 | 0.0294 | 0.8318 | 0.0288 | 0.8961 | 0.0327 |
| bupa | 0.6407 | 0.0618 | 0.6550 | 0.0641 | 0.5798 | 0.0084 | 0.7056 | 0.0761 | 0.7192 | 0.0356 |
| contraceptive | 0.4684 | 0.0331 | 0.4752 | 0.0248 | 0.5146 | 0.0263 | 0.5533 | 0.0258 | 0.5580 | 0.0152 |
| glass | 0.6057 | 0.0706 | 0.5363 | 0.0721 | 0.6204 | 0.0849 | 0.7063 | 0.0505 | 0.6685 | 0.0782 |
| haberman | 0.7575 | 0.0460 | 0.7508 | 0.0515 | 0.7417 | 0.0340 | 0.7682 | 0.0476 | 0.7609 | 0.0295 |
| iris | 0.9400 | 0.0554 | 0.9467 | 0.0581 | 0.9600 | 0.0533 | 0.9600 | 0.0800 | 0.8933 | 0.0611 |
| penbased | 0.8576 | 0.0118 | 0.8449 | 0.0116 | 0.8390 | 0.0098 | 0.9569 | 0.0053 | 0.8187 | 0.0099 |
| phoneme | 0.7792 | 0.0059 | 0.7811 | 0.0074 | 0.7456 | 0.0145 | 0.7722 | 0.0196 | 0.7894 | 0.0166 |
| pima | 0.7566 | 0.0382 | 0.7579 | 0.0322 | 0.7409 | 0.0460 | 0.3669 | 0.0475 | 0.7891 | 0.0047 |
| saheart | 0.6994 | 0.0589 | 0.7079 | 0.0483 | 0.7057 | 0.0027 | 0.7271 | 0.0398 | 0.7642 | 0.0306 |
| satimage | 0.7882 | 0.0130 | 0.7934 | 0.0165 | 0.7918 | 0.0164 | 8.8193 | 0.0138 | 0.8613 | 0.0122 |
| sonar | 0.7410 | 0.0818 | 0.7780 | 0.0609 | 0.7880 | 0.0592 | 0.8070 | 0.0634 | 0.8558 | 0.0603 |
| tae | 0.5578 | 0.1053 | 0.5319 | 0.1027 | 0.5337 | 0.1252 | 8.8203 | 0.0529 | 0.5773 | 0.0655 |
| transfusion | 0.7614 | 0.0119 | 0.7639 | 0.0152 | 0.7679 | 0.0142 | 0.7594 | 0.0435 | 0.7894 | 0.0140 |
| vehicle | 0.5557 | 0.0288 | 0.5427 | 0.0488 | 0.5602 | 0.0301 | 0.6529 | 0.0318 | 0.6023 | 0.0225 |
| vowel | 0.6515 | 0.0434 | 0.5929 | 0.1063 | 0.5141 | 0.0351 | 0.6475 | 0.0475 | 0.7111 | 0.0274 |
| wine | 0.9556 | 0.0598 | 0.9503 | 0.0673 | 0.9561 | 0.0537 | 0.9612 | 0.0512 | 0.9944 | 0.0281 |
| yeast | 0.3574 | 0.0158 | 0.3831 | 0.0251 | 0.4145 | 0.0196 | 0.6085 | 0.0456 | 0.5684 | 0.0340 |
| MEAN | 0.6900 | 0.0448 | 0.6932 | 0.0476 | 0.6837 | 0.0404 | 0.7497 | 0.0424 | 0.7373 | 0.0302 |

TABLE 11

Classification accuracy of different discretization algorithms on K-Nearest Neighbors (KNN) classifier model

| | Ameva | | CACC | | CAIM | | ChiMerge | | FUSINTER |
|---|---|---|---|---|---|---|---|---|---|
| | Avg | Std-Dev | Avg | Std-Dev | Avg | Std-Dev | Avg | Std-Dev | Avg |
| abalone | 0.1062 | 0.0127 | 0.1837 | 0.0381 | 0.2436 | 0.0127 | 0.2616 | 0.0244 | 0.2463 |
| appendicitis | 0.8896 | 0.0653 | 0.8896 | 0.0683 | 0.8804 | 0.0685 | 0.8796 | 0.0709 | 0.8814 |
| balance | 0.8048 | 0.0465 | 0.7455 | 0.0542 | 0.8048 | 0.0465 | 0.8207 | 0.0266 | 0.8610 |
| bupa | 0.6805 | 0.0678 | 0.6694 | 0.0483 | 0.6315 | 0.0702 | 0.5853 | 0.0475 | 0.6485 |
| contraceptive | 0.4792 | 0.0411 | 0.4759 | 0.0449 | 0.4990 | 0.0274 | 0.5411 | 0.0349 | 0.5438 |
| glass | 0.5320 | 0.0781 | 0.3290 | 0.0272 | 0.6546 | 0.0962 | 0.6901 | 0.0535 | 0.6742 |
| haberman | 0.7273 | 0.0608 | 0.7051 | 0.0506 | 0.7610 | 0.0401 | 0.7254 | 0.0540 | 0.7574 |
| iris | 0.9267 | 0.0492 | 0.9267 | 0.0492 | 0.9200 | 0.0613 | 0.9467 | 0.0757 | 0.9333 |
| penbased | 0.9586 | 0.0073 | 0.9610 | 0.0088 | 0.9852 | 0.0044 | 0.9872 | 0.0049 | 0.9871 |
| phoneme | 0.7232 | 0.0129 | 0.7406 | 0.0194 | 0.7345 | 0.0193 | 0.7160 | 0.0095 | 0.8699 |

TABLE 11-continued

| | | | | | | | | FUSINTER Avg |
|---|---|---|---|---|---|---|---|---|
| pima | 0.7136 | 0.0390 | 0.6744 | 0.0337 | 0.7279 | 0.0489 | 0.7200 | 0.0517 | 0.7292 |
| saheart | 0.6940 | 0.0432 | 0.6300 | 0.0427 | 0.6950 | 0.0343 | 0.7120 | 0.0435 | 0.6668 |
| satimage | 0.2423 | 0.0028 | 0.2382 | 0.0006 | 0.8986 | 0.0140 | 0.8987 | 0.0111 | 0.9052 |
| sonar | 0.8213 | 0.0749 | 0.7160 | 0.0781 | 0.8068 | 0.0865 | 0.8213 | 0.0585 | 0.8266 |
| tae | 0.5115 | 0.0875 | 0.4981 | 0.1275 | 0.5382 | 0.0847 | 0.4822 | 0.0049 | 0.4780 |
| transfusion | 0.7374 | 0.0512 | 0.7565 | 0.0576 | 0.6465 | 0.1148 | 0.6699 | 0.0552 | 0.7638 |
| vehicle | 0.6976 | 0.0273 | 0.6917 | 0.0259 | 0.7106 | 0.0359 | 0.7106 | 0.0311 | 0.7354 |
| vowel | 0.7788 | 0.0572 | 0.6798 | 0.0547 | 0.7899 | 0.0464 | 0.3071 | 0.0405 | 0.8101 |
| wine | 0.9493 | 0.0412 | 0.9437 | 0.0524 | 0.9656 | 0.0396 | 0.9656 | 0.0296 | 0.9656 |
| yeast | 0.5843 | 0.0572 | 0.4973 | 0.0608 | 0.5813 | 0.0396 | 0.5962 | 0.0391 | 0.5566 |
| MEAN | 0.6780 | 0.0462 | 0.6476 | 0.0470 | 0.7238 | 0.0496 | 0.7269 | 0.0429 | 0.7420 |

| | FUSINTER | HDD | | Modified Chi2 | | MODL | | AEMOD | |
|---|---|---|---|---|---|---|---|---|---|
| | Std-Dev | Avg | Std-Dev | Avg | Std-Dev | Avg | Std-Dev | Avg | Std-Dev |
| abalone | 0.0141 | 0.2501 | 0.0202 | 0.2537 | 0.0227 | 0.2575 | 0.0139 | 0.2745 | 0.0091 |
| appendicitis | 0.0811 | 0.8804 | 0.0685 | 0.8979 | 0.0678 | 0.8796 | 0.0709 | 0.9379 | 0.0723 |
| balance | 0.0348 | 0.8274 | 0.0366 | 0.8864 | 0.0206 | 0.8080 | 0.0131 | 0.9025 | 0.0237 |
| bupa | 0.0806 | 0.6951 | 0.0776 | 0.7040 | 0.0741 | 0.6375 | 0.0552 | 0.7246 | 0.0394 |
| contraceptive | 0.0452 | 0.5641 | 0.0206 | 0.5220 | 0.0274 | 0.5248 | 0.0290 | 0.5689 | 0.0188 |
| glass | 0.0562 | 0.5546 | 0.0789 | 0.7083 | 0.0531 | 0.6806 | 0.0648 | 0.7429 | 0.0821 |
| haberman | 0.0412 | 0.7477 | 0.0435 | 0.7576 | 0.0380 | 0.7242 | 0.0586 | 0.7608 | 0.0344 |
| iris | 0.0703 | 0.9000 | 0.0786 | 0.9533 | 0.0549 | 0.9533 | 0.0632 | 0.9733 | 0.0466 |
| penbased | 0.0053 | 0.9904 | 0.0044 | 0.9892 | 0.0049 | 0.9885 | 0.0054 | 0.9894 | 0.0065 |
| phoneme | 0.0162 | 0.8780 | 0.0139 | 0.8747 | 0.0123 | 0.8579 | 0.0119 | 0.8621 | 0.0107 |
| pima | 0.0391 | 0.7110 | 0.0385 | 0.7332 | 0.0325 | 0.6615 | 0.0492 | 0.7943 | 0.0282 |
| saheart | 0.0519 | 0.6409 | 0.0643 | 0.6927 | 0.0604 | 0.6365 | 0.0462 | 0.7597 | 0.0348 |
| satimage | 0.0108 | 0.8210 | 0.0100 | 0.9034 | 0.0094 | 0.9077 | 0.0115 | 0.9068 | 0.0107 |
| sonar | 0.0611 | 0.7780 | 0.0451 | 0.8250 | 0.0814 | 0.7937 | 0.1024 | 0.8702 | 0.0322 |
| tae | 0.0631 | 0.5055 | 0.1290 | 0.4812 | 0.1483 | 0.4804 | 0.1163 | 0.6649 | 0.1046 |
| transfusion | 0.0393 | 0.7372 | 0.0708 | 0.7732 | 0.0252 | 0.7153 | 0.0619 | 0.8066 | 0.0353 |
| vehicle | 0.0319 | 0.6688 | 0.0299 | 0.6679 | 0.0409 | 0.7199 | 0.0411 | 0.7068 | 0.0246 |
| vowel | 0.0264 | 0.8374 | 0.0338 | 0.8010 | 0.0570 | 0.7929 | 0.0385 | 0.8495 | 0.0226 |
| wine | 0.0396 | 0.8030 | 0.0808 | 0.9605 | 0.0598 | 0.9319 | 0.0457 | 0.9833 | 0.0375 |
| yeast | 0.0555 | 0.5840 | 0.0473 | 0.5703 | 0.0594 | 0.5536 | 0.0314 | 0.5942 | 0.0443 |
| MEAN | 0.0432 | 0.7187 | 0.0496 | 0.7478 | 0.0475 | 0.7253 | 0.0465 | 0.7837 | 0.0359 |

TABLE 12

Classification accuracy of different discretization algorithms on classification model SVM

| | Ameva | | CACC | | CAIM | | ChiMerge | | FUSINTER |
|---|---|---|---|---|---|---|---|---|---|
| | Avg | Std-Dev | Avg | Std-Dev | Avg | Std-Dev | Avg | Std-Dev | Avg |
| abalone | 0.2228 | 0.0145 | 0.2405 | 0.0183 | 0.2782 | 0.0115 | 0.2746 | 0.0092 | 0.2751 |
| appendicitis | 0.3805 | 0.0789 | 0.8814 | 0.0769 | 0.8814 | 0.0769 | 0.8795 | 0.0808 | 0.8797 |
| balance | 0.7728 | 0.0304 | 0.7007 | 0.0297 | 0.7728 | 0.0304 | 0.3351 | 0.0470 | 0.8577 |
| bupa | 0.6900 | 0.0435 | 0.7102 | 0.0515 | 0.6724 | 0.0364 | 0.6550 | 0.0551 | 0.6692 |
| contraceptive | 0.5071 | 0.0290 | 0.5339 | 0.0266 | 0.5343 | 0.0254 | 0.5560 | 0.0242 | 0.5614 |
| glass | 0.4832 | 0.0822 | 0.3557 | 0.0143 | 0.7109 | 0.0528 | 0.7111 | 0.0459 | 0.6826 |
| haberman | 0.7352 | 0.0395 | 0.7421 | 0.0376 | 0.7613 | 0.0334 | 0.7481 | 0.0307 | 0.7611 |
| iris | 0.9400 | 0.0554 | 0.9400 | 0.0554 | 0.9267 | 0.0467 | 0.9467 | 0.0581 | 0.9467 |
| penbased | 0.9789 | 0.0068 | 0.0675 | 0.0061 | 0.9905 | 0.0048 | 0.9926 | 0.0044 | 0.9922 |
| phoneme | 0.7916 | 0.0059 | 0.7961 | 0.0063 | 0.7961 | 0.0039 | 0.7887 | 0.0088 | 0.8538 |
| pima | 0.7278 | 0.0308 | 0.7305 | 0.0309 | 0.7409 | 0.0134 | 0.7343 | 0.0309 | 0.7501 |
| saheart | 0.7145 | 0.0503 | 0.7188 | 0.0450 | 0.7012 | 0.0337 | 0.7228 | 0.0343 | 0.7100 |
| satimage | 0.2500 | 0.0053 | 0.2382 | 0.0005 | 0.8995 | 0.0085 | 0.9015 | 0.0105 | 0.9021 |
| sonar | 0.8513 | 0.0607 | 0.8358 | 0.0824 | 0.8366 | 0.0577 | 0.8314 | 0.0652 | 0.8887 |
| tae | 0.5551 | 0.1445 | 0.5600 | 0.1310 | 0.5305 | 0.1248 | 0.5431 | 0.3568 | 0.5267 |
| transfusion | 0.7922 | 0.0276 | 0.7869 | 0.0244 | 0.7641 | 0.0157 | 0.7680 | 0.0194 | 0.7681 |
| vehicle | 0.7306 | 0.0210 | 0.7307 | 0.0489 | 0.7483 | 0.0430 | 0.7484 | 0.0306 | 0.7683 |
| vowel | 0.9273 | 0.0185 | 0.9212 | 0.0278 | 0.9071 | 0.0191 | 0.9141 | 0.0240 | 0.8788 |
| wine | 0.9886 | 0.0229 | 0.9775 | 0.0276 | 0.9601 | 0.0361 | 0.9775 | 0.0276 | 0.9660 |
| yeast | 0.6063 | 0.0523 | 0.5781 | 0.0414 | 0.6031 | 0.0378 | 0.6132 | 0.0465 | 0.5937 |
| MEAN | 0.7073 | 0.0410 | 0.6963 | 0.0391 | 0.7508 | 0.0356 | 0.7570 | 0.0405 | 0.7616 |

TABLE 12-continued

| | FUSINTER | HDD | | Modified Chi2 | | MODL | | AEMOD | |
|---|---|---|---|---|---|---|---|---|---|
| | Std-Dev | Avg | Std-Dev | Avg | Std-Dev | Avg | Std-Dev | Avg | Std-Dev |
| abalone | 0.0112 | 0.2773 | 0.0102 | 0.2768 | 0.0105 | 0.2763 | 0.0133 | 0.2825 | 0.0042 |
| appendicitis | 0.0552 | 0.8814 | 0.0769 | 0.8705 | 0.0688 | 0.8697 | 0.0595 | 0.9379 | 0.0686 |
| balance | 0.0319 | 0.8243 | 0.0471 | 0.9008 | 0.0188 | 0.8081 | 0.0248 | 0.9073 | 0.0195 |
| bupa | 0.0574 | 0.7270 | 0.0619 | 0.7213 | 0.0684 | 0.6666 | 0.0653 | 0.7332 | 0.0371 |
| contraceptive | 0.0202 | 0.5594 | 0.0206 | 0.5492 | 0.0283 | 0.5587 | 0.0248 | 0.5851 | 0.0190 |
| glass | 0.0836 | 0.7309 | 0.0475 | 0.7172 | 0.0470 | 0.7114 | 0.0371 | 0.7787 | 0.0639 |
| haberman | 0.0230 | 0.7381 | 0.0238 | 0.7448 | 0.0301 | 0.7222 | 0.0394 | 0.7581 | 0.0257 |
| iris | 0.0499 | 0.9467 | 0.0581 | 0.9400 | 0.0554 | 0.9533 | 0.0600 | 0.9667 | 0.0447 |
| penbased | 0.0069 | 0.9950 | 0.0037 | 0.9932 | 0.0048 | 0.9930 | 0.0047 | 0.9934 | 0.0056 |
| phoneme | 0.0138 | 0.8581 | 0.0129 | 0.8534 | 0.0086 | 0.8388 | 0.0096 | 0.8533 | 0.0101 |
| pima | 0.0348 | 0.7708 | 0.0290 | 0.7552 | 0.0250 | 0.7591 | 0.0324 | 0.8020 | 0.0282 |
| saheart | 0.0555 | 0.7188 | 0.0642 | 0.7229 | 0.0527 | 0.7080 | 0.0446 | 0.7792 | 0.0335 |
| satimage | 0.0117 | 0.9002 | 0.0095 | 0.9007 | 0.0102 | 0.9013 | 0.0083 | 0.9054 | 0.0086 |
| sonar | 0.0623 | 0.8558 | 0.0825 | 0.7878 | 0.0663 | 0.8706 | 0.0558 | 0.9319 | 0.0663 |
| tae | 0.1447 | 0.5784 | 0.1677 | 0.5924 | 0.1694 | 0.5533 | 0.1495 | 0.6524 | 0.1106 |
| transfusion | 0.0145 | 0.7865 | 0.0292 | 0.7680 | 0.0174 | 0.7830 | 0.0221 | 0.8066 | 0.0295 |
| vehicle | 0.0528 | 0.7837 | 0.0453 | 0.7601 | 0.0364 | 0.7495 | 0.0329 | 0.7873 | 0.0381 |
| vowel | 0.0344 | 0.9566 | 0.0163 | 0.8687 | 0.0433 | 0.9071 | 0.0162 | 0.9606 | 0.0123 |
| wine | 0.0373 | 0.9889 | 0.0222 | 0.9666 | 0.0273 | 0.9826 | 0.0266 | 0.9944 | 0.0167 |
| yeast | 0.0424 | 0.6090 | 0.0349 | 0.6124 | 0.0391 | 0.5913 | 0.0319 | 0.6173 | 0.0499 |
| MEAN | 0.0422 | 0.7743 | 0.0432 | 0.7651 | 0.0414 | 0.7602 | 0.0379 | 0.8017 | 0.0346 |

As shown in Table 8-Table 12 and FIG. 4-FIG. 7, in terms of the number of cut-points, although the AEMOD algorithm according to the present invention obtained the least number of cut-points only on the 2/20 dataset, the average number of cut-points obtained by the AEMOD algorithm on all datasets, except MEMOD, was less than that obtained by the other algorithms; and in terms of the classification accuracy, after the datasets processed by the different discretization algorithms were respectively applied to CART, Naive Bayes, KNN and SVM classifiers, the classification accuracy of the AEMOD algorithm on the 14/20, 11/20, 14/20 and 17/20 datasets is higher than that of the other discretization algorithms, and the AEMOD algorithm has the highest average accuracy on all datasets (except Naive Bayes), which indicates that the AEMOD algorithm may obtain the discretization scheme with high generalization ability.

TABLE 13

| | Classification accuracy of different datasets on CatBoost before and after discretization | | | | | | | | | |
|---|---|---|---|---|---|---|---|---|---|---|
| | Ameva | | CACC | | CAIM | | ChiMerge | | FUSINTER | |
| | Avg | Std-Dev | Avg | Std-Dev | Avg | Std-Dev | Avg | Std-Dev | Avg | Std-Dev |
| abalone | 0.2250 | 0.0161 | 0.2422 | 0.0195 | 0.2785 | 0.0130 | 0.2781 | 0.0107 | 0.2746 | 0.0125 |
| appendicitis | 0.8623 | 0.0785 | 0.8633 | 0.0185 | 0.8623 | 0.0785 | 0.8888 | 0.0684 | 0.8714 | 0.0667 |
| balance | 0.7690 | 0.0296 | 0.7907 | 0.0297 | 0.7680 | 0.0296 | 0.8351 | 0.0425 | 0.8561 | 0.0281 |
| bupa | 0.6899 | 0.8466 | 0.7330 | 0.0500 | 0.6724 | 0.0364 | 0.6491 | 0.0602 | 0.7122 | 0.0715 |
| contraceptive | 0.5228 | 0.0256 | 0.5254 | 0.0207 | 0.5356 | 0.00264 | 0.5655 | 0.0213 | 0.5594 | 0.0191 |
| glass | 0.4929 | 0.0571 | 0.4027 | 0.0566 | 0.7591 | 0.0416 | 0.7992 | 0.0523 | 0.7385 | 0.0700 |
| haberman | 0.7450 | 0.0244 | 0.7354 | 0.0201 | 0.7559 | 0.0339 | 0.7481 | 0.0377 | 0.7688 | 0.0353 |
| iris | 0.9267 | 0.0467 | 0.9267 | 0.0462 | 0.9333 | 0.0516 | 0.9400 | 0.0554 | 0.9867 | 0.0499 |
| penbased | 0.9665 | 0.0096 | 0.9492 | 0.0106 | 0.9710 | 0.0074 | 0.9735 | 0.0080 | 0.9734 | 0.0077 |
| phoneme | 0.7948 | 0.0070 | 0.7990 | 0.0058 | 0.7944 | 0.0060 | 0.7885 | 0.0090 | 0.8649 | 0.0098 |
| pima | 0.7214 | 0.0233 | 0.7266 | 0.0329 | 0.7500 | 0.0167 | 0.7396 | 0.0362 | 0.7657 | 0.0321 |
| saheart | 0.6994 | 0.0547 | 0.7296 | 0.0436 | 0.7317 | 0.0420 | 0.7186 | 0.0377 | 0.7101 | 0.0526 |
| satimage | 0.2483 | 0.0040 | 0.2382 | 0.0005 | 0.8827 | 0.0089 | 0.8849 | 0.0094 | 0.8858 | 0.0111 |
| sonar | 0.8545 | 0.0798 | 0.8400 | 0.0967 | 0.8309 | 0.0927 | 0.8152 | 0.0914 | 0.8556 | 0.0946 |
| tae | 0.5541 | 0.1567 | 0.5533 | 0.1637 | 0.5186 | 0.1119 | 0.5673 | 0.1578 | 0.5655 | 0.1607 |
| transfusion | 0.7908 | 0.0303 | 0.7923 | 0.0214 | 0.7695 | 0.9117 | 0.7600 | 0.0130 | 0.7667 | 0.0228 |
| vehicle | 0.7225 | 0.0289 | 0.7215 | 0.0502 | 0.7341 | 0.0392 | 0.7330 | 0.0339 | 0.7389 | 0.0345 |
| vowel | 0.8889 | 0.0143 | 0.8879 | 0.0273 | 0.8930 | 0.0328 | 0.8798 | 0.0437 | 0.8556 | 0.0454 |
| wine | 0.9778 | 0.0272 | 0.9778 | 0.0369 | 0.9889 | 0.0222 | 0.9722 | 0.0278 | 0.9713 | 0.0285 |
| yeast | 0.6201 | 0.0480 | 0.5705 | 0.0335 | 0.6124 | 0.1076 | 0.6146 | 0.0443 | 0.5977 | 0.0426 |
| MEAN | 0.2006 | 0.0404 | 0.6957 | 0.0402 | 0.7521 | 0.0370 | 0.7556 | 0.0427 | 0.7635 | 0.0448 |

TABLE 13-continued

| | HDD | | Modified Chi2 | | MODL | | AEMOD | | Continuous | |
|---|---|---|---|---|---|---|---|---|---|---|
| | Avg | Std-Dev | Avg | Std-Dev | Avg | Std-Dev | Avg | Std-Dev | Avg | Std-Dev |
| abalone | 0.2801 | 0.0071 | 0.2811 | 0.0149 | 0.2777 | 0.0109 | 0.2818 | 0.0080 | 0.2719 | 0.0090 |
| appendicitis | 0.8623 | 0.0785 | 0.8805 | 0.0789 | 0.8897 | 0.0595 | 0.9379 | 0.0686 | 0.8705 | 0.0688 |
| balance | 0.8162 | 0.0440 | 0.3783 | 0.0211 | 0.8863 | 0.0258 | 0.8977 | 0.0201 | 0.0041 | 0.0155 |
| bupa | 0.7267 | 0.0800 | 0.7387 | 0.0762 | 0.7039 | 0.0787 | 0.7273 | 0.0315 | 0.7267 | 0.0800 |
| contraceptive | 0.5655 | 0.0167 | 0.5608 | 0.0262 | 0.5614 | 0.0194 | 0.5852 | 0.0201 | 0.5655 | 0.0167 |
| glass | 0.7515 | 0.0640 | 0.7394 | 0.0516 | 0.7403 | 0.0573 | 0.7885 | 0.0637 | 0.7580 | 0.0449 |
| haberman | 0.7386 | 0.0193 | 0.7486 | 0.0211 | 0.7383 | 0.0269 | 0.7816 | 0.0187 | 0.7416 | 0.0239 |
| iris | 0.9333 | 0.0616 | 0.9467 | 0.0653 | 0.9600 | 0.0533 | 0.9667 | 0.0532 | 0.9600 | 0.0533 |
| penbased | 0.9742 | 0.0067 | 0.9728 | 0.0011 | 0.9125 | 0.0672 | 0.9748 | 0.0076 | 0.9742 | 0.0067 |
| phoneme | 0.8723 | 0.0102 | 0.3684 | 0.0111 | 0.8732 | 0.0098 | 0.8645 | 0.0093 | 0.8723 | 0.0102 |
| pima | 0.7670 | 0.0244 | 0.7683 | 0.0241 | 0.7709 | 0.0238 | 0.8073 | 0.0286 | 0.7670 | 0.0244 |
| saheart | 0.6993 | 0.0461 | 0.7143 | 0.0404 | 0.7188 | 0.0432 | 0.7445 | 0.0412 | 0.6992 | 0.0277 |
| satimage | 0.8828 | 0.0096 | 0.8870 | 0.0090 | 0.8842 | 0.0109 | 0.8922 | 0.0085 | 0.8855 | 0.0114 |
| sonar | 0.8295 | 0.1222 | 0.8027 | 0.0822 | 0.8359 | 0.1067 | 0.9178 | 0.0719 | 0.8343 | 0.1241 |
| tae | 0.6117 | 0.1607 | 0.6053 | 0.1729 | 0.5865 | 0.1781 | 0.6716 | 0.1056 | 0.6117 | 0.1607 |
| transfusion | 0.8026 | 0.0281 | 0.7972 | 0.0287 | 0.7962 | 0.0247 | 0.8095 | 0.0272 | 0.8013 | 0.0295 |
| vehicle | 0.7377 | 0.0425 | 0.7380 | 0.0492 | 0.7272 | 0.0349 | 0.7625 | 0.0268 | 0.7366 | 0.0413 |
| vowel | 0.9283 | 0.0336 | 0.8515 | 0.0353 | 0.8889 | 0.0263 | 0.9212 | 0.0278 | 0.9283 | 0.0336 |
| wine | 0.9833 | 0.0255 | 0.9605 | 0.0369 | 0.9778 | 0.0272 | 0.9944 | 0.0167 | 0.9833 | 0.0255 |
| yeast | 0.6098 | 0.0419 | 0.6064 | 0.0324 | 0.5893 | 0.0274 | 0.6193 | 0.0443 | 0.6098 | 0.0419 |
| MEAN | 0.7687 | 0.0456 | 0.7673 | 0.0443 | 0.7640 | 0.0426 | 0.7973 | 0.0351 | 0.7751 | 0.0425 |

Figure 8:
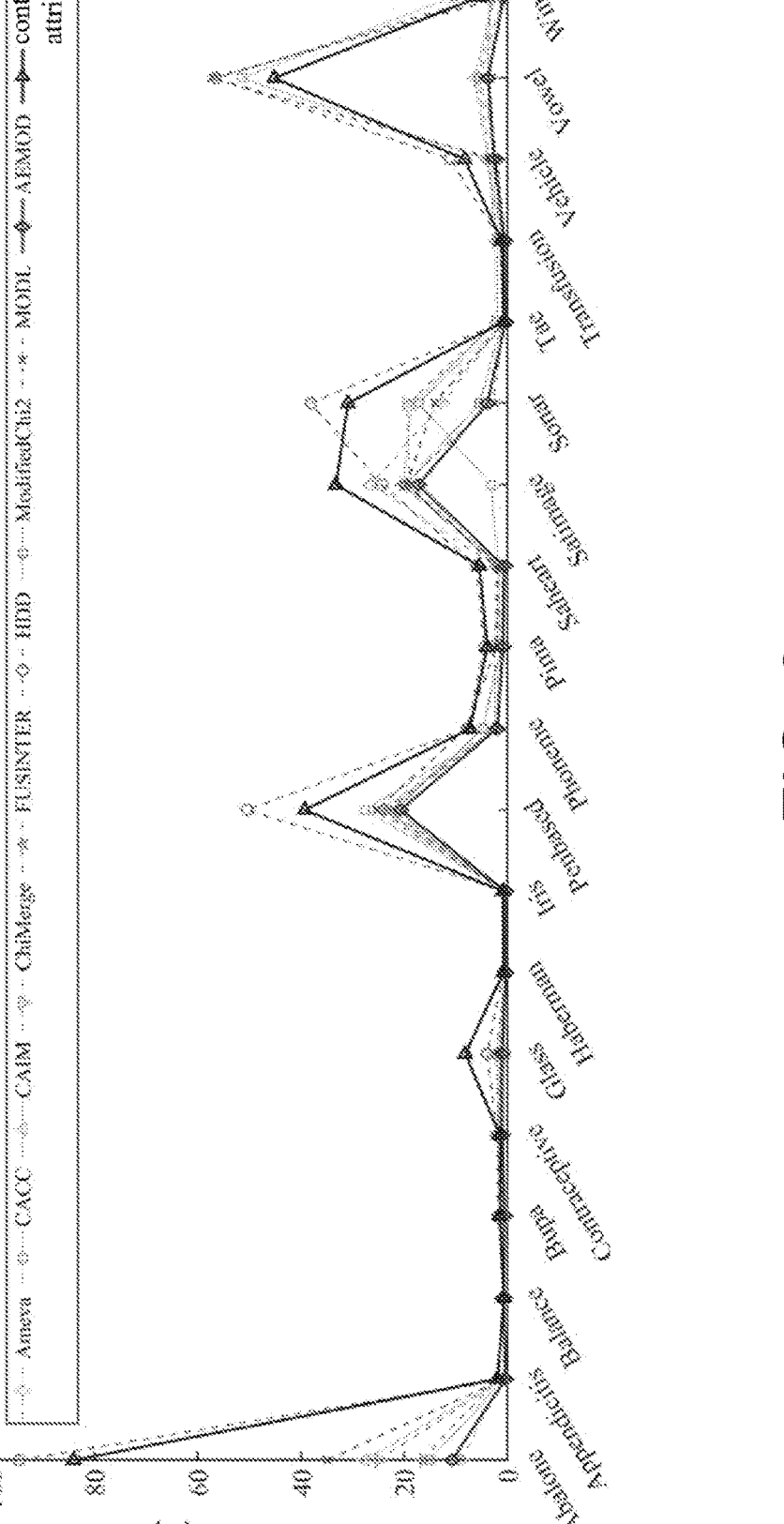
FIG. 8 a schematic diagram of runtime of different datasets before and after discretization on a CatBoost classification model in Embodiment 3.

As can be seen from Table 13, compared with the direct use of the original dataset, the discrete dataset obtained by the AEMOD algorithm according to the present invention has a certain degree of improvement in classification accuracy in subsequent classification tasks. It indicates that the AEMOD algorithm may reduce the influence of the information loss in the discretization process by adding in the objective function an index that measures the difference between the importance rankings of the attributes before and after discretization and retaining as much as possible the relative importance of each attribute after discretization. Meanwhile, as noise brought by abnormal data is removed in the discretization process, the AEMOD algorithm is more conducive to subsequent classification compared with continuous attributes. FIG. 8 is a schematic diagram of runtime of different datasets on the classification model CatBoost before and after discretization according to this embodiment. It can be seen from FIG. 8 that because the discrete dataset obtained by the AEMOD algorithm may be simpler, the execution speed of the subsequent classification tasks may also be higher. The above experimental results and analysis may be concluded that the AEMOD algorithm may effectively divide continuous numerical attributes to obtain more valuable cut-points and retain more data information, so as to obtain a discretization scheme with a better balance between accuracy and simplicity.

Compared with the prior art, the technical solutions of the present invention have the following beneficial effects:

(1) According to the present invention, by discretizing the original brain image dataset and using the discretized brain image dataset for subsequent classification tasks, the correlation between distribution characteristics and attributes of data may be fully considered in order to retain key information, the computational complexity of algorithms and the storage requirements are reduced, and at the same time, the classification accuracy and efficiency are improved.

(2) According to the present invention, by constructing the multi-objective function including the information loss before and after dataset discretization, the classification error rate, and the discrete data complexity, searching for the optimal solution of the multi-objective function using a multi-objective optimization algorithm to obtain the discretization scheme, and discretizing the original brain image dataset using the discretization scheme. Thus, the information loss before and after discretization of the brain image dataset may be reduced, and at the same time, the discretized brain image dataset is simpler, and the classification error rate is decreased, thereby greatly improving the classification accuracy and efficiency of the subsequent brain image classification tasks.

In the description of this specification, reference to the description of the terms "one embodiment", "some embodiments", "example", "specific example", or "some examples", etc. means that the specific features, structures, materials, or characteristics described in connection with the embodiment or example are included in at least one embodiment or example of the present application. In this specification, schematic representations of the above terms are not to be construed as necessarily referring to the same embodiment or example. Furthermore, the specific features, structures, materials, or characteristics described may be combined in any suitable manner in any one or N embodiments or examples. In addition, without contradicting each other, a person skilled in the art may combine and integrate different embodiments or examples and features of different embodiments or examples described in this specification.

Furthermore, the terms "first" and "second" are merely provided for descriptive purposes and are not to be construed as indicating or implying relative importance or implicitly indicating the number of technical features indicated. Thus, a feature defined as "first" or "second" may explicitly or implicitly include at least one of the features. In the description of the present application, "N" refers to at least two, for example, two or three, unless expressly and specifically limited otherwise.

Any process or method description in the flow diagram or otherwise described herein may be understood to represent a module, fragment, or portion that includes codes of one or N executable instructions for implementing the steps of a customized logic function or process, and the scope of the preferred implementations of the present application includes additional implementations, which may be implemented out of the order shown or discussed, including performing functions in a substantially simultaneous manner or in reverse order according to the functions involved, as should be understood by those skilled in the art to which the embodiments of the present application belong.

It should be understood that the various portions of the present application may be implemented in hardware, software, firmware, or combinations thereof. In the implementations described above, the N steps or methods may be implemented in software or firmware stored in a memory and executed by a suitable instruction execution system. If implemented in hardware as in the alternative implementation, it may be implemented with any of the following techniques known in the art or combinations thereof: discrete logic circuits having logic gates for implementing logic functions on data signals, application-specific integrated circuits having suitable combinational logic gates, programmable gate arrays, field programmable gate arrays, and the like.

A person of ordinary skill in the art may understand that all or part of the steps carried by the above method embodiments can be completed by a program that instructs the associated hardware, where the program may be stored in a computer-readable storage medium, and the program, when executed, includes one or a combination of the steps of the method embodiments.

Apparently, the above embodiments of the present invention are merely examples of the present invention for purposes of clarity and are not intended to limit the implementations of the present invention. Changes or modifications in other different forms may also be made by a person of ordinary skill in the art on the basis of the above description. All implementations need not to be, and cannot be, exhaustive. Any modifications, equivalent replacements, improvements, etc. made within the spirit and principle of the present invention shall fall within the scope of protection of the claims of the present invention.

What is claimed is:

1. A brain image classification method based on discretized data, comprising steps of:

S1: acquiring an original brain image dataset, and dividing the original brain image dataset into an original training set, an original validation set, and an original test set;

S2: constructing a multi-objective function comprising an information loss before and after dataset discretization, a classification error rate, and a discrete data complexity;

S3: searching for an optimal solution of the multi-objective function using the original training set and the original validation set to obtain a discretization scheme;

S4: discretizing the original training set, the original validation set and the original test set according to the discretization scheme, respectively, to obtain a discrete training set, a discrete validation set, and a discrete test set;

S5: performing feature selection on the discrete training set and the discrete validation set, and performing feature reduction on the discrete training set and the discrete test set using a feature selection result to obtain a reduced discrete training set and a reduced discrete test set;

S6: training a classifier using the reduced discrete training set, and inputting the reduced discrete test set into the trained classifier for classification to obtain a brain image data classification result, wherein an expression of the multi-objective function is as follows:

$$\text{minimize}(f(R))=\text{minimize}(f_1(R),f_2(R),f_3(R))$$

wherein minimize($\cdot$) denotes a minimization operation, $f_1(R)$ denotes an objective function of the information loss before and after dataset discretization, $f_2(R)$ denotes an objective function of the classification error rate, $f_3(R)$ denotes an objective function of the discrete data complexity, $R=\{r_1, r_2, \ldots, r_i, \ldots r_m\}$ denotes a set of the discrete intervals of all continuous attributes in the original brain image dataset, $r_i$ denotes the discrete intervals of an ith continuous attribute, and m denotes the number of the continuous attributes in the original brain image dataset;

the information loss before and after dataset discretization is a difference between importance rankings of attributes before and after dataset discretization, and the objective function $f_1(R)$ of the information loss before and after dataset discretization is as follows:

$$f_1(R)=_1\_\text{NDCG}$$

wherein NDCG is a normalized discounted cumulative gain used to measure the difference between the importance rankings of the attributes before and after dataset discretization;

an expression of the objective function $f_2(R)$ of the classification error rate is as follows:

$$f_2(R) = \frac{\delta_{CART} + \delta_{KNN}}{2}$$

wherein $\delta_{CART}$ denotes a ratio of the number of misclassified samples to the total number of samples after the discretized brain image dataset has been applied to a classification model CART, and $\delta_{KNN}$ denotes a ratio of the number of misclassified samples to the total number of samples after the discretized brain image dataset has been applied to K-Nearest Neighbors (KNN) classifier model; and the objective function $f_3(R)$ of the discrete data complexity counts the discrete intervals of continuous attributes with the discrete intervals being not 1 in the original brain image dataset, an expression of the objective function $f_3(R)$ is as follows:

$$f_3(R) = \sum_{i=1}^{m} r_i[r_i == 1], \text{ where } [r_i == 1] = \begin{cases} 0, & \text{if } r_i = 1 \\ 1, & \text{otherwise} \end{cases}.$$

2. The brain image classification method based on discretized data according to claim 1, wherein S5 specifically comprises steps of:

S5.1: calculating Pearson correlation coefficients of each column of brain region features in the discrete training set and the discrete validation set;

S5.2: sorting each column of brain region features in the discrete training set and the discrete validation set in descending order according to absolute values of the Pearson correlation coefficients of the column of brain region features, and selecting first b features as a key brain region feature candidate set, wherein b is a hyper-parameter determined by grid search;

S5.3: performing feature selection in the key brain region feature candidate set using a genetic algorithm to obtain a key brain region feature set;

S5.4: performing feature reduction on the discrete training set and the discrete test set using the key brain region feature set, respectively, to obtain the reduced discrete training set and the reduced discrete test set.

3. The brain image classification method based on discretized data according to claim 2, wherein the key brain region feature candidate set comprises: a surface area of, a gray matter volume of, a mean thickness of, a thickness standard deviation of, an integral correction mean curvature of, an integral correction Gaussian curvature of, a fold index of, and an intrinsic curvature index of the cerebral cortex.

4. The brain image classification method based on discretized data according to claim 1, wherein the information loss before and after dataset discretization is the difference between the importance rankings of the attributes before and after dataset discretization, a step of acquiring the normalized discounted cumulative gain NDCG specifically comprises:

calculating collective correlation coefficient values of all continuous attributes in the original brain image dataset;

constructing, on the basis of the collective correlation coefficient values of all continuous attributes in the original brain image dataset, a set $RO^{(k)}=\{ro_1^{(k)}, \ldots, ro_i^{(k)}, \ldots ro_k^{(k)}\}$ of the importance rankings of first k continuous attributes in the original brain image dataset, wherein $ro_i^{(R)}$ denotes an importance ranking of an ith continuous attribute among the first k continuous attributes in the original brain image dataset;

discretizing the original brain image dataset, and calculating collective correlation coefficient values of all discrete attributes in the discretized brain image dataset;

constructing, on the basis of the collective correlation coefficient values of all discrete attributes in the discretized brain image dataset, a set $RD^{(k)}=\{rd_1^{(k)}, \ldots, rd_i^{(k)}, \ldots rd_k^{(k)}\}$ of importance rankings of first k discrete attributes in the discretized brain image dataset, wherein $rd_i^{(k)}$ denotes an importance ranking of an ith discrete attribute among the first k discrete attributes in the discretized brain image dataset;

calculating scores of the importance rankings of the first k continuous attributes in the original brain image dataset and the first k discrete attributes in the discretized brain image dataset respectively, with expressions being as follows:

$$IDCG^{(k)} = ro_1^{(k)} + \sum_{i=2}^{k^{(k)}} \frac{ro_i^{(k)}}{\log_2(i+1)}$$

$$DCG^{(k)} = rd_1^{(k)} + \sum_{i=2}^{k^{(k)}} \frac{rd_i^{(k)}}{\log_2(i+1)}$$

wherein $IDCG^{(k)}$ denotes the score of the importance rankings of the first k continuous attributes in the original brain image dataset, and $DCG^{(k)}$ denotes the score of the importance rankings of the first k discrete attributes in the discretized brain image dataset; and calculating the normalized discounted cumulative gain NDCG on the basis of the scores of the importance rankings of the first k continuous attributes in the original brain image dataset and the first k discrete attributes in the discretized brain image dataset, with an expression being as follows:

$$NDCG^{(k)} = \frac{DCG^{(k)}}{IDCG^{(k)}}$$

$$NDCG = \frac{\sum_{k=1}^{m} NDCG^{(k)}}{m}.$$

5. The brain image classification method based on discretized data according to claim 4, wherein a step of calculating the collective correlation coefficient values is as follows:

standardizing the original brain image dataset of or the discretized brain image dataset of n*m dimension to obtain a standardized brain image dataset with the expression being as follows:

$$M_s = \left[M - \frac{1}{n}MI\right] \operatorname{diag}\left(\frac{1}{s_1} \frac{1}{s_2}, \ldots, \frac{1}{s_i}, \ldots, \frac{1}{s_m}\right)$$

wherein n denotes a number of data samples, m denotes a number of continuous attributes or discrete attributes, $M_s$ denotes a standardized brain image dataset, M denotes the original brain image dataset or the discretized brain image dataset, I denotes an n*n dimensional matrix with each element equal to 1, diag(·) denotes a diagonal matrix, and a diagonal element $s_i(i=1, 2, \ldots, m)$ denotes a standard deviation of the ith continuous attribute or discrete attribute;

a correlation matrix of standardized sample data is a sample covariance matrix, and $R_M$ is set to denote a sample correlation matrix:

calculating the sample correlation matrix $R_M$ of the original brain image dataset or the discretized brain image dataset, with the expression being as follows:

$$R_M = \frac{1}{n-1} M_s^T M_s$$

wherein $M_s^T$ denotes the transpose of $M_s$;

sorting feature values of the sample correlation matrix $R_M$ in descending order to obtain a feature sequence $\lambda_1$, $\lambda_2, \ldots, \lambda_i, \ldots, \lambda_m$ and feature vectors $u_1, u_2, \ldots, u_i \ldots u_m$ corresponding to the feature sequence; and calculating the collective correlation coefficient values $\rho_{Y,q_j}$ of the continuous attributes or the discrete attributes on the basis of the feature sequence or the feature vectors, with an expression being as follows:

$$\rho_{Y,q_j} = \sum_{i=1}^{m} h_i |\rho_{Y_i,q_j}| = \sum_{i=1}^{m} \frac{h_i |u_{ji}| \sqrt{\lambda_i}}{\sqrt{\sigma_j}}$$

wherein $Y_i$ denotes an ith principal component, $q_j$ denotes a jth continuous attribute or discrete attribute in the original brain image dataset or the discretized brain image dataset, $h_i$ denotes a contribution of a variance of the ith principal component to a total variance, $u_{ji}$ denotes an ith element of a jth feature vector, and $\sigma_j$ denotes a variance of the jth continuous attribute or discrete attribute.

6. The brain image classification method based on discretized data according to claim 4, wherein the constructing, on the basis of the collective correlation coefficient values of all continuous attributes in the original brain image dataset, a set $RO^{(k)}$ of the importance rankings of first k continuous attributes in the original brain image dataset specifically comprises steps of:

discretizing the collective correlation coefficient values of all continuous attributes in the original brain image dataset to obtain discretization collective correlation coefficient values;

sorting, on the basis of the discretization collective correlation coefficient values, the continuous attributes in the original brain image dataset in descending order according to the discretization collective correlation coefficient values of the continuous attributes to obtain a descending sequence of continuous attributes;

assigning an integer score value to each continuous attribute in the descending sequence of continuous attributes to obtain a set RO of the importance rankings of all continuous attributes, wherein the smaller the discretization collective correlation coefficient value corresponding to the continuous attribute is, the smaller the score value assigned to the continuous attribute is, and when different continuous attributes correspond to a same discretization collective correlation coefficient value, the different continuous attributes are assigned with the same score; and constructing $RO^{(k)}$ by taking the first k continuous attributes from the set of importance rankings of all continuous attributes; and the constructing, on the basis of the collective correlation coefficient values of all discrete attributes in the discretized brain image dataset, a set $RD^{(k)}$ of importance rankings of first k discrete attributes in the discretized brain image dataset specifically comprises steps of:

sorting, on the basis of the collective correlation coefficient values of all discrete attributes in the discretized brain image dataset, the discrete attributes in the discretized brain image dataset in descending order according to the discretization collective correlation coefficient values of the discrete attributes to obtain a descending sequence of discrete attributes;

assigning the discrete attributes in the descending sequence of discrete attributes with the same integer score value as corresponding continuous attributes in the original brain image dataset to obtain a set RD of the importance rankings of all discrete attributes; and constructing $RD^{(k)}$ by taking the first k discrete attributes from the set of importance rankings of all discrete attributes.

7. The brain image classification method based on discretized data according to claim 1, wherein the optimal solution of the multi-objective function is heuristically searched for using a non-dominated sorting genetic algorithm NSGA-II to obtain the discretization scheme, specifically comprising steps of:

S3.1: initializing a population of and a code of the non-dominated sorting genetic algorithm, wherein each chromosome in the population comprises the discrete intervals of all continuous attributes in the original brain image dataset, the code is a positional code, and an ith gene in the positional code denotes the discrete intervals of the ith continuous attribute;

S3.2: assessing the chromosome individuals by means of the multi-objective function to calculate a fitness value of each chromosome in the population;

S3.3: dividing the population into a plurality of non-dominated layers of different levels on the basis of the fitness values according to a Pareto dominance criterion, and calculating a crowding distance of chromosomes of each non-dominated layer with respect to neighboring chromosomes located on a non-dominated layer of the same level, wherein the plurality of non-dominated layers of different levels have the following dominance relationship: a solution of an nth non-dominated layer is dominated by solutions of previous n−1 non-dominated layers;

S3.4: screening to obtain N parent chromosomes on the basis of the levels of the non-dominated layers and the crowding distances, and creating a mating pool using the parent chromosomes;

S3.5: performing crossover and mutation operations on the parent chromosomes in the mating pool and introducing an elite selection strategy to obtain a child chromosome population with a size of N;

S3.6: iteratively performing S3.4-S3.5 until the number of iterations reaches a threshold, so as to obtain an optimal solution set of the multi-objective function, and constructing the discretization scheme by using the optimal solution set.

8. The brain image classification method based on discretized data according to claim 7, wherein S3.4 specifically comprises steps of:

S3.4.1: randomly combining N chromosomes in an initial population in pairs to produce N/2 pairs of candidate chromosome combinations;

S3.4.2: screening the N/2 pairs of candidate chromosome combinations to obtain N/2 winner chromosomes by performing following operations:

(1) for all candidate chromosome combinations, selecting chromosomes in non-dominated layers of low levels as the winner chromosomes;

(2) when two chromosomes in a candidate chromosome combination are in the non-dominated layers of the same level, selecting a chromosome having a larger crowding distance as the winner chromosome;

(3) when two chromosomes in a candidate chromosome combination are in the non-dominated layers of the same level and have the same crowding distance, randomly selecting a chromosome as the winner chromosome;

S3.4.3: performing S3.4.1-S3.4.2 one more time to obtain N/2 winner chromosomes again by screening, so as to obtain N winner chromosomes in total;

S3.4.4: setting the N winner chromosomes as the parent chromosomes, and creating the mating pool using the parent chromosomes.

9. The brain image classification method based on discretized data according to claim 7, wherein S3.5 specifically comprises following steps of:

S3.5.1: performing crossover and mutation operations on the parent chromosomes in the mating pool to generate N child chromosomes;

S3.5.2: combining the generated child chromosomes with the parent chromosomes to form a new candidate population;

S3.5.3: dividing the chromosome individuals in the new candidate population into a plurality of non-dominated layers of different levels according to a dominance relationship;

S3.5.4: calculating crowding distances of chromosome individuals in each non-dominated layer;

S3.5.5: selecting N chromosomes on the basis of the levels of the non-dominated layers and the crowding distances to obtain the child chromosome population with the size of N.

* * * * *